US012192168B1

United States Patent
Marques

(10) Patent No.: US 12,192,168 B1
(45) Date of Patent: Jan. 7, 2025

(54) UNIFIED PROGRAMMABLE DYNAMIC CONTEXT-AWARE CONFIGURATION FOR DOMAIN NAME SERVICE

(71) Applicant: Adriano Monteiro Marques, Cedar Park, TX (US)

(72) Inventor: Adriano Monteiro Marques, Cedar Park, TX (US)

( * ) Notice: Subject to any disclaimer, the term of this patent is extended or adjusted under 35 U.S.C. 154(b) by 0 days.

(21) Appl. No.: 18/600,535

(22) Filed: Mar. 8, 2024

Related U.S. Application Data

(60) Provisional application No. 63/604,350, filed on Nov. 30, 2023.

(51) Int. Cl.
*H04L 61/4511* (2022.01)
*H04L 47/125* (2022.01)

(52) U.S. Cl.
CPC ........ *H04L 61/4511* (2022.05); *H04L 47/125* (2013.01)

(58) Field of Classification Search
CPC .......................... H04L 61/4511; H04L 47/125
See application file for complete search history.

(56) References Cited

U.S. PATENT DOCUMENTS

| | | | | |
|---|---|---|---|---|
| 6,012,088 A * | 1/2000 | Li | ....................... | H04L 12/2898 709/219 |
| 6,014,660 A * | 1/2000 | Lim | ..................... | H04L 61/4511 709/200 |
| 6,023,724 A * | 2/2000 | Bhatia | ................. | H04L 41/0677 709/224 |
| 6,028,848 A * | 2/2000 | Bhatia | .................... | H04M 11/06 370/257 |
| 6,029,203 A * | 2/2000 | Bhatia | ................. | H04M 11/068 709/248 |

(Continued)

FOREIGN PATENT DOCUMENTS

| | | |
|---|---|---|
| EP | 1125421 B1 | 6/2006 |
| EP | 3646573 B1 | 5/2020 |
| JP | 4668775 B2 | 4/2011 |

OTHER PUBLICATIONS

Web: "How do you implement DNS geolocation for dynamic and static content?", Domain Name System (DNS), Dec. 12, 2023, 06 pages, [Downloaded on Jan. 4, 2020] Retrieved from [URL: https://www.linkedin.com/advice/0/how-do-you-implement-dns-geolocation-dynamic].

(Continued)

*Primary Examiner* — Jimmy H Tran

(57) ABSTRACT

A method includes identifying, by a Domain Name Service (DNS) server, a dynamic configuration file. The method further includes receiving, by the DNS server from a first client device, a first request for a network resource. The first request includes first client context associated with the first client device. The method further includes identifying, by the DNS server based on the network resource of the first request, a dynamic variable in the dynamic configuration file. The dynamic variable includes one or more algorithmically-defined rules. The method further includes determining, by the DNS server based on at least one of the one or more algorithmically-defined rules of the dynamic variable and the first client context, a first response to the first request. The method further includes providing, by the DNS server, the first response to the first client device.

20 Claims, 16 Drawing Sheets

(56) References Cited

U.S. PATENT DOCUMENTS

| | | | |
|---|---|---|---|
| 6,052,803 A * | 4/2000 | Bhatia | H04L 9/40 |
| | | | 714/49 |
| 6,070,191 A * | 5/2000 | Narendran | G06F 9/5083 |
| | | | 714/E11.015 |
| 6,094,659 A * | 7/2000 | Bhatia | H04L 12/5692 |
| | | | 707/999.01 |
| 6,108,330 A * | 8/2000 | Bhatia | H04Q 11/0457 |
| | | | 370/352 |
| 6,118,768 A * | 9/2000 | Bhatia | H04Q 11/0471 |
| | | | 370/254 |
| 6,272,523 B1 * | 8/2001 | Factor | G06F 9/505 |
| | | | 709/201 |
| 6,360,256 B1 * | 3/2002 | Lim | G06F 11/3495 |
| | | | 709/227 |
| 6,396,830 B2 * | 5/2002 | Aravamudan | H04L 61/4511 |
| | | | 370/352 |
| 6,411,966 B1 * | 6/2002 | Kwan | H04L 61/58 |
| 6,560,634 B1 * | 5/2003 | Broadhurst | G06F 16/951 |
| | | | 709/219 |
| 6,643,694 B1 * | 11/2003 | Chernin | H04L 41/0253 |
| | | | 709/217 |
| 6,684,243 B1 * | 1/2004 | Euget | H04L 61/5014 |
| | | | 709/217 |
| 6,701,329 B1 * | 3/2004 | Esibov | H04L 61/5076 |
| 6,741,853 B1 * | 5/2004 | Jiang | H04M 3/4938 |
| | | | 455/445 |
| 6,769,031 B1 * | 7/2004 | Bero | H04L 61/5076 |
| | | | 709/217 |
| 6,802,068 B1 * | 10/2004 | Guruprasad | H04L 67/14 |
| | | | 709/227 |
| 6,836,806 B1 * | 12/2004 | Raciborski | H04L 47/125 |
| | | | 707/E17.108 |
| 6,865,594 B1 * | 3/2005 | Belissent | H04L 61/5076 |
| | | | 709/206 |
| 6,888,836 B1 * | 5/2005 | Cherkasova | H04L 67/1038 |
| | | | 370/400 |
| 6,895,431 B1 * | 5/2005 | Bero | H04L 41/12 |
| | | | 709/221 |
| 6,961,783 B1 * | 11/2005 | Cook | H04L 63/0236 |
| | | | 709/227 |
| 7,003,562 B2 * | 2/2006 | Mayer | H04L 41/12 |
| | | | 703/21 |
| 7,007,080 B2 * | 2/2006 | Wilson | H04L 12/2856 |
| | | | 709/221 |
| 7,010,585 B2 | 3/2006 | Asami | |
| 7,013,343 B2 * | 3/2006 | Shigezumi | H04L 63/0236 |
| | | | 709/225 |
| 7,027,582 B2 * | 4/2006 | Khello | H04M 7/0075 |
| | | | 455/433 |
| 7,117,227 B2 * | 10/2006 | Call | A61L 2/10 |
| | | | 709/219 |
| 7,304,984 B2 * | 12/2007 | Butler | H04Q 3/0058 |
| | | | 370/395.2 |
| 7,330,908 B2 | 2/2008 | Jungck | |
| 7,352,853 B1 * | 4/2008 | Shen | H04Q 3/0062 |
| | | | 379/201.12 |
| 7,359,987 B2 * | 4/2008 | Stahura | H04L 61/4511 |
| | | | 709/228 |
| 7,441,045 B2 * | 10/2008 | Skene | G06F 9/505 |
| | | | 709/201 |
| 7,478,148 B2 * | 1/2009 | Neerdaels | H04L 61/4511 |
| | | | 726/11 |
| 7,636,936 B2 * | 12/2009 | Wright | G06F 21/604 |
| | | | 713/153 |
| 7,720,997 B1 * | 5/2010 | Gourlay | H04L 12/5692 |
| | | | 709/245 |
| 7,734,730 B2 * | 6/2010 | McCanne | H04L 61/45 |
| | | | 709/219 |
| 7,818,435 B1 * | 10/2010 | Jellinek | H04L 67/2895 |
| | | | 709/219 |
| 8,296,451 B2 * | 10/2012 | Lowery | H04L 67/568 |
| | | | 709/224 |
| 8,489,637 B2 | 7/2013 | Patil | |
| 8,522,034 B2 * | 8/2013 | Erlingsson | H04N 1/32144 |
| | | | 713/160 |
| 8,645,517 B2 * | 2/2014 | Stolorz | H04L 67/1023 |
| | | | 709/219 |
| 8,725,836 B2 * | 5/2014 | Lowery | H04L 67/1095 |
| | | | 709/217 |
| 8,856,222 B2 * | 10/2014 | McCanne | H04L 67/5651 |
| | | | 709/236 |
| 9,021,070 B2 * | 4/2015 | Selgas | H04L 63/08 |
| | | | 717/172 |
| 9,396,476 B2 * | 7/2016 | Walker | G06F 16/9535 |
| 9,479,422 B2 | 10/2016 | Sundaresan et al. | |
| 9,906,605 B2 | 2/2018 | Nguyen et al. | |
| 10,212,123 B2 | 2/2019 | Baughman et al. | |
| 10,284,520 B2 | 5/2019 | Reddy | |
| 10,516,751 B2 * | 12/2019 | Morton | H04L 67/1031 |
| 10,521,453 B1 * | 12/2019 | Bush | H04L 61/4511 |
| 10,666,608 B2 | 5/2020 | Townsend et al. | |
| 10,728,206 B2 | 7/2020 | Dhanabalan | |
| 10,728,287 B2 | 7/2020 | Foxhoven et al. | |
| 10,826,748 B2 * | 11/2020 | Alao | H04L 51/066 |
| 10,893,017 B2 | 1/2021 | George, IV et al. | |
| 10,931,786 B1 * | 2/2021 | Vasquez | H04L 41/0893 |
| 11,128,597 B1 * | 9/2021 | Johnson | H04L 9/0643 |
| 11,269,781 B1 | 3/2022 | Lercari et al. | |
| 2009/0113075 A1 * | 4/2009 | Migault | H04L 61/5061 |
| | | | 709/245 |
| 2012/0191874 A1 * | 7/2012 | Robinson | H04L 61/4552 |
| | | | 709/245 |
| 2013/0297596 A1 * | 11/2013 | Mouline | G06F 16/9537 |
| | | | 707/723 |
| 2014/0280916 A1 * | 9/2014 | Balasubramanian | |
| | | | H04L 61/457 |
| | | | 709/224 |
| 2015/0215276 A1 * | 7/2015 | Bhagwat | H04L 61/5014 |
| | | | 709/220 |
| 2015/0244671 A1 * | 8/2015 | Sinn | H04L 61/4511 |
| | | | 709/245 |
| 2015/0350154 A1 * | 12/2015 | Myla | H04L 67/01 |
| | | | 709/245 |
| 2016/0087937 A1 * | 3/2016 | Rodriguez | G06F 21/335 |
| | | | 709/223 |
| 2016/0308819 A1 * | 10/2016 | Gupta | H04L 61/4511 |
| 2017/0331788 A1 * | 11/2017 | Lemon | G06F 16/90335 |
| 2018/0324137 A1 * | 11/2018 | Tuliani | H04L 61/4511 |
| 2018/0337885 A1 * | 11/2018 | Singh | H04L 41/22 |
| 2019/0097933 A1 * | 3/2019 | Rutkowski | H04L 67/1021 |
| 2019/0132281 A1 * | 5/2019 | Sawyer | H04L 47/122 |
| 2019/0166215 A1 * | 5/2019 | Johnson | H04L 67/02 |
| 2020/0036778 A1 * | 1/2020 | Flavel | H04L 69/321 |
| 2020/0220839 A1 * | 7/2020 | Sawyer | H04L 45/74 |
| 2020/0366637 A1 * | 11/2020 | Dhanabalan | H04L 61/5007 |
| 2021/0092134 A1 * | 3/2021 | Ludwig | H04L 63/1416 |
| 2021/0105248 A1 * | 4/2021 | Brown | H04L 61/4511 |
| 2022/0182354 A1 * | 6/2022 | Fayed | H04L 61/5007 |
| 2023/0231856 A1 * | 7/2023 | Kaliski, Jr. | H04L 63/123 |
| | | | 726/4 |
| 2023/0291738 A1 * | 9/2023 | Pelzel | H04L 67/1012 |
| 2024/0022541 A1 * | 1/2024 | Lee | H04L 61/4541 |
| 2024/0121265 A1 * | 4/2024 | Holloway | H04L 63/1466 |

OTHER PUBLICATIONS

Web: "Could a name server resolve IP addresses dynamically based on some strategy?", Server Fault, Sep. 20, 2021, 06 pages, [Downloaded on Apr. 4, 2024] Retrieved from [URL: https://serverfault.com/questions/941506/could-a-name-server-resolve-ip-addresses-dynamically-based-on-some-strategy].

Web: "Use DNS Policy for Geo-Location Based Traffic Management with Primary Servers", Learn, Dec. 12, 2023, 07 pages, [Downloaded on Apr. 4, 2024] Retrieved from [URL: https://learn.microsoft.com/en-us/windows-server/networking/dns/deploy/primary-geo-location].

Web: "apple/pkl", GitHub, 04 pages, [Downloaded on Apr. 4, 2024] Retrieved from [URL: https://github.com/apple/pkl].

(56) References Cited

OTHER PUBLICATIONS

Web: "Dynamic DNS", Wikipedia, Apr. 4, 2024, 05 pages, [Downloaded on Apr. 4, 2024] Retrieved from [URL: https://en.wikipedia.org/wiki/Dynamic_DNS].

Youtube: "Introducing Reverse Proxy Servers," Oct. 5, 2012, 4 pages, [Downloaded on Apr. 4, 2024] Retrieved from [URL: https://www.youtube.com/watch?v=9rOU_P5YN_Q].

Youtube: "Anycast vs Global Server Load Balancing on the Brightboard," Dec. 1, 2022, 12 pages, [Downloaded on Apr. 4, 2024] Retrieved from [URL: https://www.youtube.com/watch?v=-2WnHiKPrgE].

Web: "Cloud-Based Primary and Secondary Authoritative Dns", F5, 06 pages, [Downloaded on Apr. 4, 2024] Retrieved from [URL: https://www.f5.com/cloud/products/dns].

Web: "CoreDNS: DNS and Service Discovery", CoreDNS, 04 pages, [Downloaded on Apr. 4, 2024] Retrieved from [URL: https://coredns.io].

Web: "CoreDNS Manual", CoreDNS, 23 pages, [Downloaded on Apr. 4, 2024] Retrieved from [URL: https://coredns.io/manual/toc/#authoritative-serving-from-files].

Web: "Dynamic DNS", Cloud Flare, 4 pages, [Downloaded on Apr. 4, 2024] Retrieved from [URL: https://www.cloudflare.com/learning/dns/glossary/dynamic-dns/].

Web: "Pkl Introduction", 01 page, [Downloaded on May 2, 2024] Retrieved from [https://pkl-lang.org/main/current/introduction/].

* cited by examiner

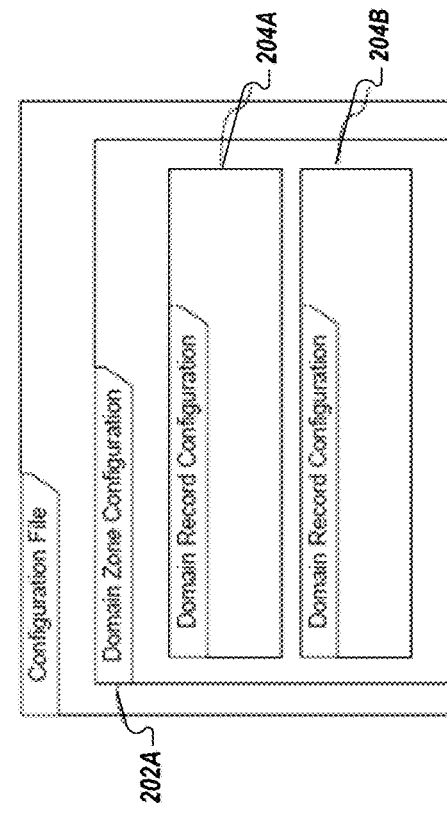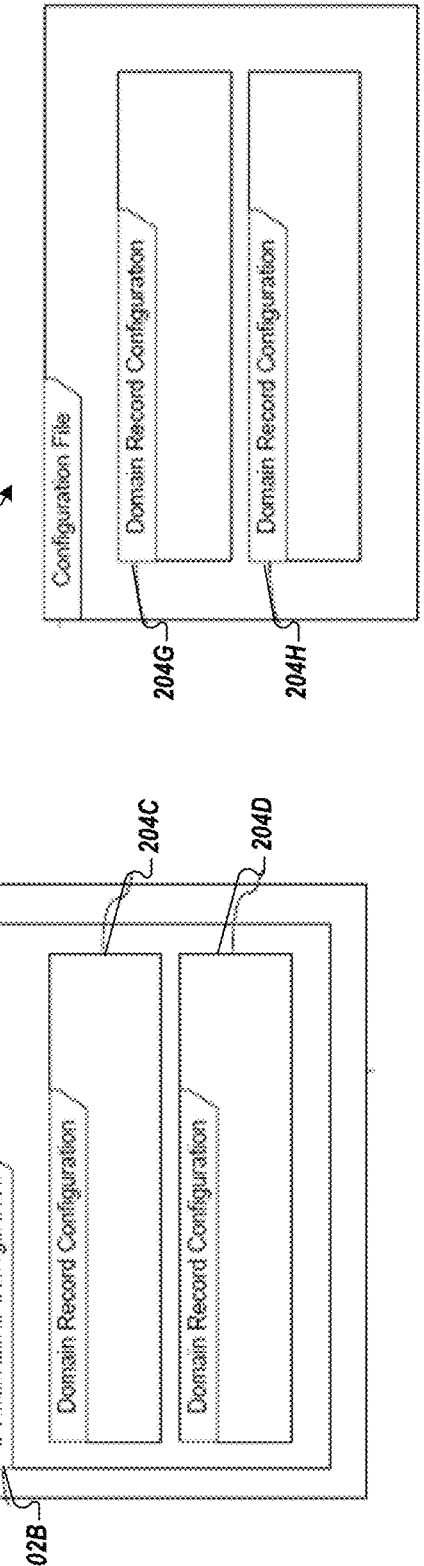

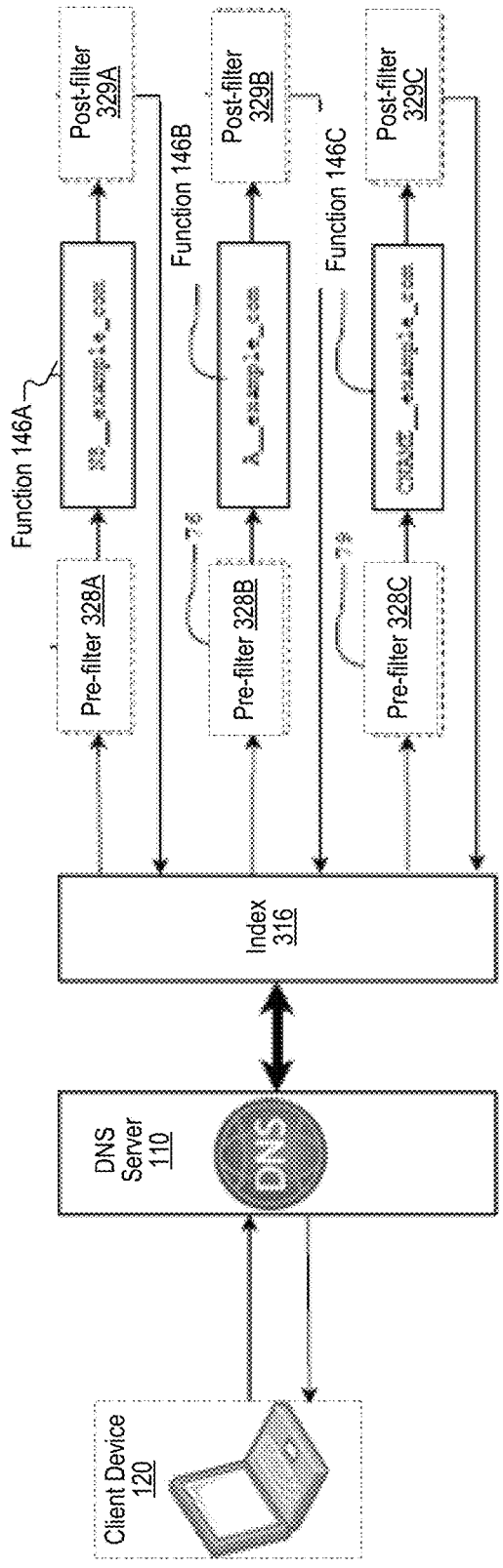
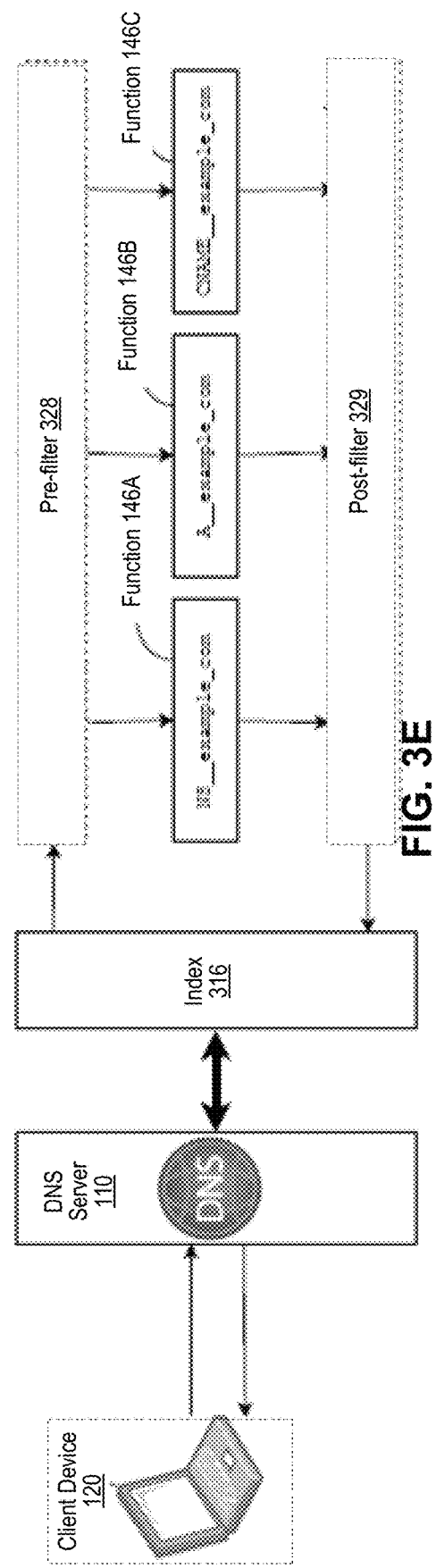
FIG. 3D
FIG. 3E

UNIFIED PROGRAMMABLE DYNAMIC CONTEXT-AWARE CONFIGURATION FOR DOMAIN NAME SERVICE

RELATED APPLICATION

This application claims benefit of U.S. Provisional Patent Application No. 63/604,350, filed Nov. 30, 2023, the contents of which are incorporated by reference in their entirety.

TECHNICAL FIELD

Embodiments of the present disclosure relate to configurations, and in particular to unified programmable dynamic context-aware configurations.

BACKGROUND

Devices communicate and access data via networks. For example, client devices access hypertext documents and applications of the world wide web via the Internet.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIGS. 2A-C illustrate dynamic configuration files according to certain embodiments.

FIGS. 3A-G illustrate systems associated with unified programmable dynamic context-aware configurations, according to certain embodiments.

DETAILED DESCRIPTION OF EMBODIMENTS

Figure 1A:
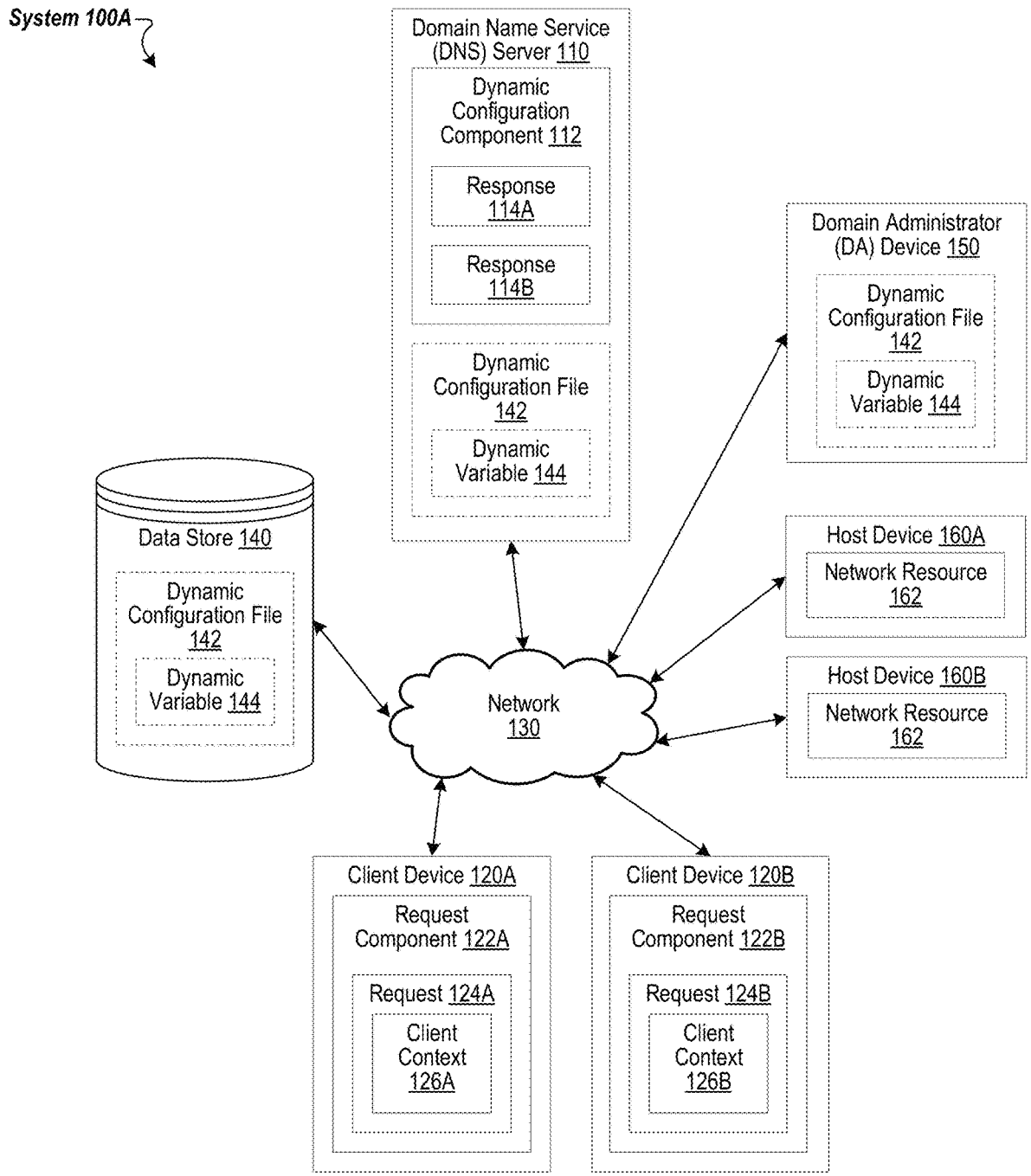
FIGS. 1A-E illustrate systems associated with unified programmable dynamic context-aware configurations, according to certain embodiments.

Embodiments described herein are related to unified programmable dynamic context-aware configurations (e.g., for domain name service (DNS)).

Devices communicate and access data via networks. For example, client devices access hypertext documents and applications of the World Wide Web via the Internet (e.g., a global system of interconnected computer networks that uses the Internet protocol suite (IP)).

DNS is a hierarchical and distributed naming system for computers, services, and other resources in the Internet or other Internet Protocol (IP) networks. DNS associates various information with domain names (e.g., identification strings) assigned to each of the associated entities. DNS translates readily memorized domain names to other information useful in authenticating, configuring, redirecting, locating, or identifying computer services and devices with the underlying network protocols.

The DNS protocol is almost as old as the Internet. Despite some updates and extensions to the protocol since its creation, the foundation upon which the Internet is built shows the limitations imposed by a protocol designed in the 1980s that now must support the Internet's scale.

Many workarounds have been created to circumvent these limitations, such as using multiple records, Anycast IPs, and Proxies, but solutions that directly address the inherent DNS limitations are lacking.

One such limitation is the protocol's inability to resolve the same name to only one of multiple different IP addresses on record based on rules that may or may not take into consideration the context of the client or the query. If context-aware routing of a client is required, the task is conventionally handled by an external solution such as a load balancer or a reverse proxy.

One of the causes of these issues is the limited nature of the static configuration files used to define domain zones and records. The static configuration files lend themselves to the easiness of evaluation and greater runtime performance, but at the same time, the static configuration files limit the service and prevent the service from being able to better accommodate a world in which cloud-native, Internet of Things (IoT), and artificial intelligence (AI)-driven applications are becoming the norm.

A conventional domain zone configuration is defined by a static configuration file. In this file, a Domain Administrator (DA) would, for example, define a typical zone record pointing the domain to the IP address of a host that serves the company's website. As the business grows and the number of visitors increases, the website now requires more hosts to distribute the load without impacting the website performance as perceived by its visitors. The DA now has two options: one of them is to add another copy of the previous record but this time pointing it to the IP address of the additional host intended to help support the extra load or point the existing record to the IP address of a Hypertext Transfer Protocol Secure (HTTP/S) load balancer or reverse proxy that will distribute the traffic between the nodes that are serving the website.

The first option may save the effort of deploying an additional host with an HTTP/S proxy while allowing for more hosts to support the additional load. In this case, however, the DNS protocol will respond to queries on this domain by returning a list with all the IP addresses available, and the client (or the operating system it runs on top of) will decide which IP it will use. This decision is random and will not favor proximity for reduced latency. Another issue associated with this strategy is that if one of the servers becomes unhealthy, the client will not attempt to switch IPs even though it already has a list of other hosts from the original DNS query it performed. The behavior becomes unpredictable and inefficient.

For that reason, most DAs opt for using an additional HTTP/S load balancer or reverse proxy host to handle the load balancing while leaving only one IP for the record, pointing to the HTTP/S proxy host. One obvious downside of this approach is the additional cost and latency introduced by an intermediary in the communication. Another downside is the introduction of a single point of failure: if the HTTP/S proxy host becomes unhealthy, no visitor can use the site even if all web servers downstream are healthy. The HTTP/S proxy is also a bottleneck, with its capacity limiting the amount of supported downstream web servers. Once that capacity is reached, additional HTTP/S proxies need to be deployed, and additional downstream web servers are attached to it. At this point, the DA is faced again with the previous conundrum: with more than one host responding for the same domain name, how can the traffic be distributed evenly and optimally since the use of multiple hosts for the same domain name doesn't solve that problem? Once again, due to the limitations in the DNS protocol, the solution lies in another piece of technology, external to the Domain Name System, called Anycast. Anycast allows multiple hosts to respond to the same IP address. By defining the same IP address for all hosts serving as an HTTP/S proxy, the DA can go back to defining a single record with a single IP address and retain full control of the load balancing. Although Anycast is powerful and efficient, its implementation is expensive and complex while not always solving the latency issue optimally.

A conventional attempt to optimize DNS query responses includes implementing an intermediary solution that sits between the DNS server and the client, reordering the responses based on a pre-defined priority policy. Unfortunately, reordering the hosts based on priority does not always help because when receiving a list of hosts from a DNS query response, different Operating Systems will process the list differently, with some using the first host in the list while others will perform a random pick. Moreover, this conventional solution continues to work around DNS limitations by adding additional resources instead of focusing on solving the problem at the DNS level, the location in which the root cause is found.

Conventional DNS servers and domain zones rely on static configuration files to operate. Although this strategy has attempted to serve the world up to this point, it is increasingly apparent that this strategy will continue to impose limitations on the future of the Internet, which continues to grow at an exponential rate with the explosive growth of Cloud, IoT, and AI-driven applications. The static configuration hampers the possibility of a smarter name resolution approach, requiring workarounds that increase latency and resource consumption.

The devices, systems, and methods of the present disclosure are associated with unified programmable dynamic context-aware configurations (e.g., for DNS).

In some embodiments, a method (e.g., implementing a unified programmable dynamic context-aware configuration) includes identifying, by a DNS server, a dynamic configuration file. The method further includes receiving, by the DNS server from a first client device, a first request for a network resource. The first request includes first client context associated with the first client device. The method further includes identifying, by the DNS server based on the network resource of the first request, a dynamic variable in the dynamic configuration file. The dynamic variable includes one or more algorithmically-defined rules. The method further includes determining, by the DNS server based on at least one of the one or more algorithmically-defined rules of the dynamic variable and the first client context, a first response to the first request. The method further includes providing, by the DNS server, the first response to the first client device.

The systems, devices, and methods of the present disclosure have advantages over conventional solutions. The present disclosure reduces bandwidth used, processor overhead, and energy consumption of the DNS server, the client device, and other devices involved in the process. In some embodiments, a unified, programmable system for DNS configuration is disclosed, featuring dynamic and context-aware adaptations. The present disclosure may depart from traditional static configuration files, employing configuration files with full featured programming capabilities and a supporting framework to address some of the limitations of the existing DNS protocol. The present disclosure offers enhanced flexibility, real-time adaptability, and improved responsiveness to evolving network conditions and user requirements.

With a unified programmable dynamic context-aware configuration, some of the load-balancing issues can be addressed by the DNS server by allowing the configuration of multiple hosts for the same domain record while only responding to queries with the IP address of the host that makes the most sense for the client who issued the query. This programmable configuration allows the DA to implement algorithms (e.g., algorithmically-defined rules) that are executed to perform actions before resolving a domain unrelated to load balancing but which has technical advantages, such as protecting the location of servers, mitigating attacks, improving efficiency, offering multiple environments under the same domain name, and many other applications.

The unified programmable dynamic context-aware configuration may reimagine the DNS service and configuration standards, liberating the protocol to achieve a fuller potential with a programmable configuration interface that is flexible enough to securely and privately provide domain name resolutions for the Internet's next generation.

With a unified programmable dynamic context-aware configuration, it is possible to use algorithms or even AI models in the name resolution process such that the context of a query is intelligently evaluated to return the most optimal response for a given situation.

Although some embodiments of the present disclosure are directed to unified programmable dynamic context-aware configurations for DNS, in some embodiments, the present disclosure can be used for unified programmable dynamic context-aware configurations for other services, systems, and/or networks.

FIGS. 1A-E illustrate systems 100A-E associated with unified programmable dynamic context-aware configurations, according to certain embodiments. In some embodiments, two or more components, features, and/or methods of any of systems 100A-E may be combined in a system 100.

FIG. 1A is a block diagram illustrating an exemplary system 100A (exemplary system architecture), according to certain embodiments. The system 100 includes DNS server 110, client devices 120A-B, data store 140, DA device 150, and/or host devices 160A-B.

In some embodiments, one or more of the DNS server 110, client devices 120A-B, data store 140, DA device 150, and/or host devices 160A-B are coupled to each other via a network 130. In some embodiments, network 130 is a public network that provides DNS server 110, client devices 120A-B, data store 140, DA device 150, host devices 160A-B, and/or other computing devices access to each other. In some embodiments, network 130 is a private network that provides DNS server 110, client devices 120A-B, data store 140, DA device 150, host devices 160A-B, and/or other computing devices access to each other. In some embodiments, network 130 includes one or more Wide Area Networks (WANs), Local Area Networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, wired network, and/or a combination thereof.

In some embodiments, the data store 140 is memory (e.g., random access memory), a drive (e.g., a hard drive, a flash drive), a database system, or another type of component or device capable of storing data. In some embodiments, data store 140 includes multiple storage components (e.g., multiple drives or multiple databases) that span multiple computing devices (e.g., multiple server computers). In some embodiments, the data store 140 stores one or more dynamic configuration files 142. In some embodiments, each dynamic configuration file 142 includes one or more dynamic variables 144 (e.g., domain zone record).

In some embodiments, the client device 120 includes a computing device such as Personal Computers (PCs), laptops, mobile phones, smart phones, tablet computers, netbook computers, embedded devices, internet-connected appliances or vehicles, IoT devices in general, etc.

In some embodiments, one or more of DNS server 110, client devices 120A-B, DA device 150, and/or host devices 160A-B includes a computing device such as Personal Computer (PC), laptop computer, mobile phone, smart phone, tablet computer, netbook computer, gateway device, rackmount server, router computer, server computer, mainframe computer, desktop computer, embedded devices, internet-connected appliances or vehicles, IoT devices in general, Graphics Processing Unit (GPU), accelerator Application-Specific Integrated Circuit (ASIC) (e.g., Tensor Processing Unit (TPU)), etc. In some embodiments, one or more of DNS server 110, client devices 120A-B, DA device 150, and/or host devices 160A-B may include one or more operating systems that allow users to one or more of consolidate, generate, view, or edit data, provide directives to other computing devices.

In some embodiments, a "user" is represented as a single individual. However, other embodiments of the disclosure encompass a "user" being an entity controlled by users and/or an automated source. In some examples, a set of individual users federated as a group of administrators is considered a "user."

In some embodiments, one or more of DNS server 110 and/or DA device 150 includes a dynamic configuration component 112. In some embodiments, client devices 120A-B each include a request component 122. In some embodiments, the request component 122 generates a request 124 that includes client context 126. In some embodiments, the DA device 150 provides a dynamic configuration file 142 (that includes one or more dynamic variables 144) to the DNS server 110. In some embodiments, DNS server 110 obtains the dynamic configuration file 142 (that includes one or more dynamic variables 144) from the data store 140. In some embodiments, each host device 160 includes a network resource 162 (e.g., domain record, media file, or other content item).

In some embodiments, the DNS server 110 includes the dynamic configuration component 112. In some embodiments, the dynamic configuration component 112 implements a unified programmable dynamic context-aware configuration. The dynamic configuration component 112 may identify a dynamic configuration file 142 (e.g., stored within DNS server 110, in data store 140, received from DA device 150, etc.). The dynamic configuration component 112 may receive, from a client device 122A, a request 124A for a network resource 162. The request 124A includes client context 126A associated with the client device 120A. The dynamic configuration component 112 identifies, based on the network resource 162 of the request 124A, a dynamic variable 144 in the dynamic configuration file 142. The dynamic variable 144 includes one or more algorithmically-defined rules. The dynamic configuration component 112 determines, based on at least one of the one or more algorithmically-defined rules of the dynamic variable 144 and the first client context 126A, a response 114A to the request 124A and provides the response 114A to the client device 120A.

In some embodiments, the dynamic configuration component 112 receives, from client device 120B, a request 124B for the network resource 162. The request 124B may include client context 126B associated with the client device 120B. The dynamic configuration component 112 identifies, based on the request 124B, the dynamic variable 144 in the dynamic configuration file 142. The dynamic configuration component 112 determines, based on the dynamic variable 144 and the client context 126B, a response 114B to the request 124B and provides the response 114B to the client device 120B.

In some embodiments, response 114A is associated with network resource 162 located at host device 160A and response 114B is associated with network resource 162 located at host device 160B.

Figure 1B:
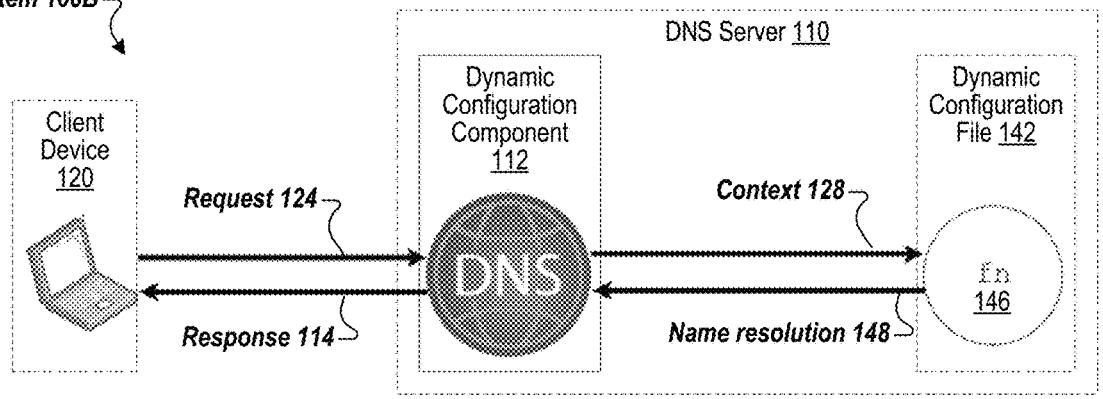
Figure 1C:
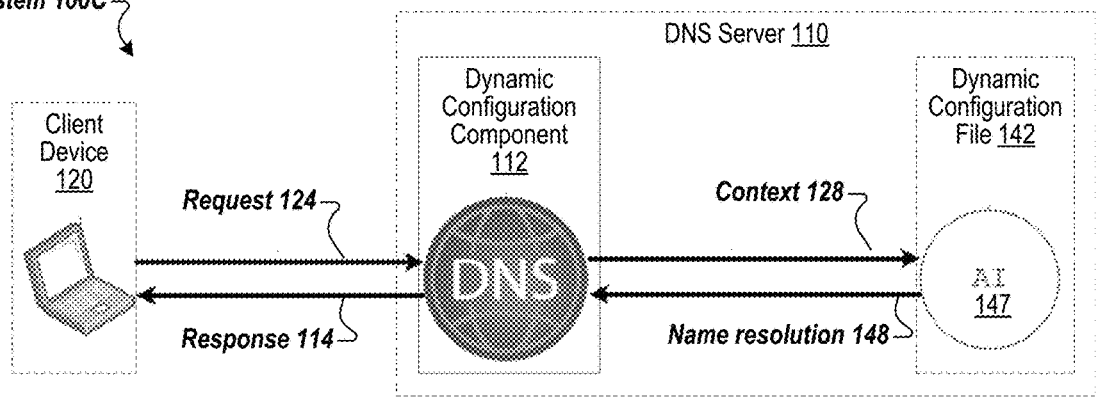

Referring to FIGS. 1B-1C, it is possible to observe what a high-level use of a unified programmable dynamic context-aware configuration can achieve when combined with the DNS protocol.

FIG. 1B illustrates a system 100B associated with a network resource 162, according to certain embodiments. FIG. 1B depicts a configuration using an algorithmic approach in which a domain record is defined by a function. The lifecycle of a request 124 (e.g., DNS query) is represented therein with the client device 120 submits a request 124 (e.g., DNS query) to be resolved by the DNS server 110 (e.g., resolver). The DNS server 110 executes the function (fn) 146 (e.g., dynamic configuration file 142, dynamic variable 144, etc.) responsible for processing requests 124 (e.g., queries) for the domain name (e.g., network resource 162) requested by the client device 120 and passes the context 128 (e.g., request 124 and/or client context 126) as an argument to the function 146. The context 128 may contain information provided by both the request 124 (e.g., query request) and the DNS Server 110. Upon processing the context 128, the function 146 returns the name resolution 148 following the dynamic variable 144 (e.g., algorithm) provided by the DA device 150 for this domain record (e.g., network resource 162). The DNS server 110 then passes on this response 114 back to the client device 120 which now is able to proceed with the original intention of the client device 120.

FIG. 1C illustrates a system 100C associated with a network resource 162, according to certain embodiments. FIG. 1C depicts a similar scenario as FIG. 1B, replacing the algorithmic approach with an AI function 147. The lifecycle of a request 124 (e.g., DNS query) is represented therein with the client device 120 submitting a request 124 (e.g., DNS query) to be resolved by the DNS server 110 (e.g., resolver). The DNS server 110 executes the AI function 147 (e.g., dynamic configuration file 142, dynamic variable 144, etc.) responsible for processing requests 124 (e.g., queries) for the domain name (e.g., network resource 162) requested by the client device 120 and passes the context 128 (e.g., request 124 and/or client context 126) as input to the AI function 147. The context 128 contains information provided by both the request 124 (e.g., query request) and the DNS Server 110. Upon processing the context 128, the AI function 147 outputs the name resolution 148 in accordance with the original intents (e.g., dynamic configuration file 142, dynamic variable 144) of the DA device 150 for this domain record (e.g., network resource 162). The DNS Server 110 then passes on this response 114 back to the client device 120 which now is able to proceed with the original intention of the client device 120.

In a simple example, with a unified programmable dynamic context-aware configuration, a DNS server 110 can be programmed to make a smarter decision on which host device 160, from a list of available servers, is closer to the client device 120 who issued the request 124 (e.g., query) and return only that host device 160 such that all communications with the host device 160 after the name resolution 148 occur with the lowest possible latency (e.g., lower latency than conventional solutions).

Figure 1D:
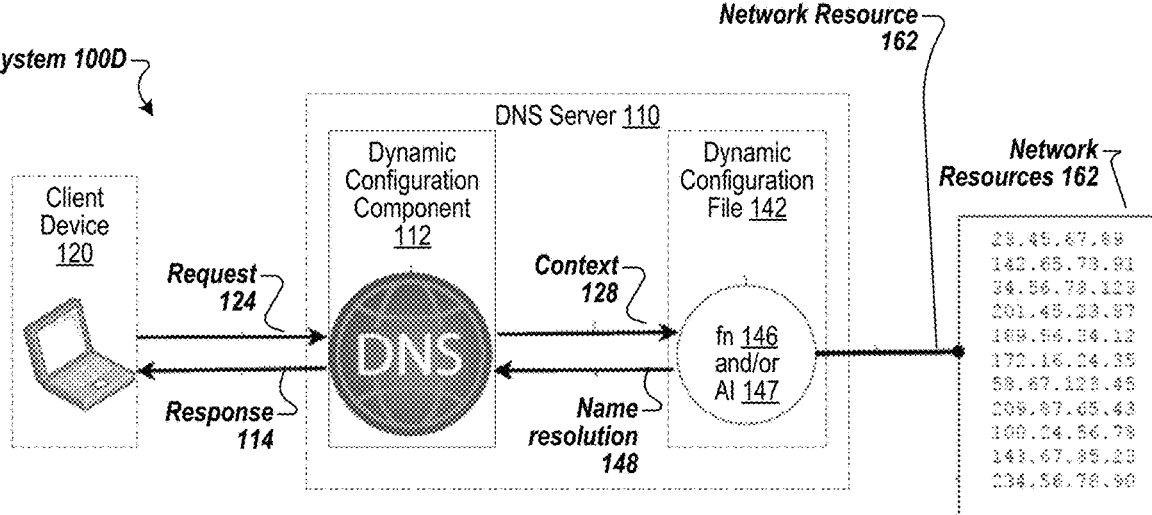

FIG. 1D illustrates this simple example of an application for the unified programmable dynamic context-aware configuration of a domain record (e.g., network resource 162) that contains multiple available servers (e.g., host devices 160) for a single domain name and a function 146 that returns only the address that is the most appropriate for the context 128 (e.g., request 124 and/or client content 126) of the client device 120.

FIG. 1D illustrates a system 100D associated with a network resource 162, according to certain embodiments. FIG. 1D depicts an example scenario. Whether the function 146 and/or AI 147 in this example is algorithmic, AI-driven, or of any other nature is irrelevant as long as the function 146 and/or AI 147 achieves the intended desire of the DA device 150 to provide a name resolution 148 of a most appropriate response within given context 128 for the client device 120 that initiated the request 124 (e.g., query). Assuming that the client device 120 is currently assigned with the IP address 34.56.63.84, and that this IP address is part of the context 128 in the request 124 (e.g., query) and in the context 128 (e.g., argument) passed to the function 146 and/or AI 147, the function 146 and/or AI 147 would estimate that of the IPs in the list of available servers (e.g., host devices 160, network resource 162) for that network resource 162 (e.g., domain name), the IP address 34.56.78.123 is the closest one to the client device 120 and achieves the original goal desired by the DA device 150 when designing the function 146 and/or AI 147. The proximity calculation can be done by employing different strategies, and the similarity of the IP addresses is just one of several potential proximity indicators. That is why a programmable configuration (e.g., function 146 and/or AI 147, dynamic configuration file 142, dynamic variable 144) is better suited for this type of decision making. The IP address 34.56.78.123 is finally fetched from the list, returned to the DNS server 110, and ultimately returned to the client device 120, who is now able to proceed with its original intention.

This is just one of the innumerable possible applications for a unified programmable dynamic context-aware configuration, which would not be limited simply to providing the host address with the lowest latency for a given client device 120. On top of this obvious capability, the Domain Administrator (DA) device 150 would be empowered with a powerful programming interface with which algorithms can be implemented based on the context of a query to issue responses that align with the interests of the business. Another example would be to serve multiple deployment environments through the same domain name. Yet another is to provide different versions of the same Application Programming Interface (API) under the same domain name. A final example would be to offer a dynamic resolution to other DNS record types that are not necessarily pointing to network addresses, but sometimes of informational or configuration nature such as start of authority (SOA), text (TXT), Canonical Name (CNAME), NS, PTR, etc. Both of these examples may be illustrated in FIG. 1E.

Figure 1E:
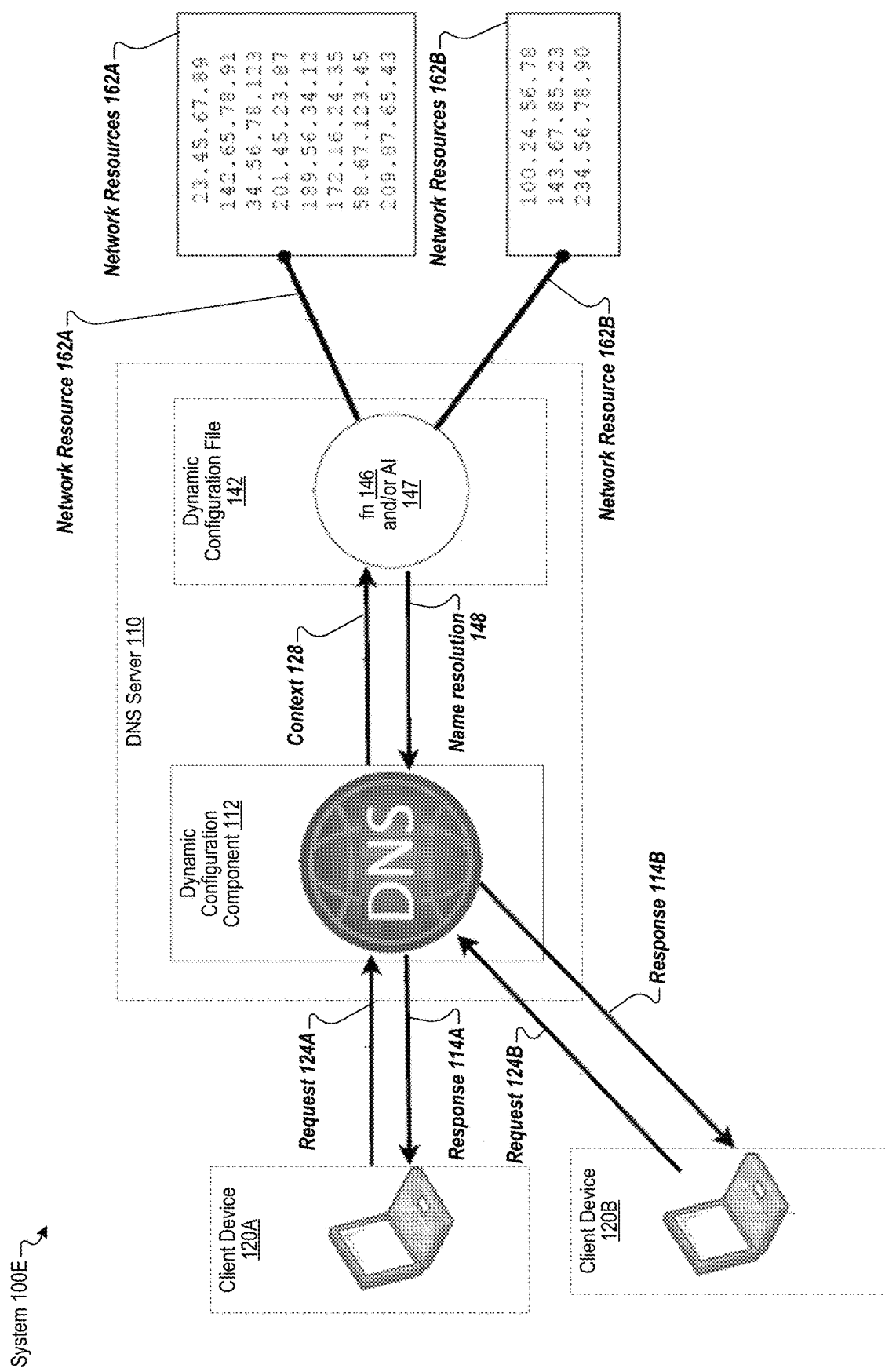

FIG. 1E illustrates a system 100E associated with a network resource 162, according to certain embodiments. Assuming that in the first scenario, there are two client devices 120: client device 120A known to be desirous to access the production version of the website (e.g., network resource 162A) and client device 120B known to be desirous to access the staging version of the website (e.g., network resource 162B). Their intent is part of their context, which can be explicitly given through request 124A and request 124B (e.g., queries), assumed by the DNS server 110 and added to the context 128 when calling the function 146 and/or AI 147, or identified inside the function 146 and/or AI 147 by any other method provided by the DA device 150. In this example, the system 100D has two lists of IPs: a list of IPs for host devices 160A providing the production version of the website (e.g., network resources 162A), and a list of IPs for host devices 160B providing the staging version of the website (e.g., network resources 162B). Once the function 146 and/or AI 147 has identified the intention of the client device 120, the function 146 and/or AI 147 picks the most appropriate network resource 162 (e.g., IP address) for the context 128 (e.g., client context 126) of the client device 120, returning the network resource 162 (e.g., IP address) with the lowest latency relative to the client device 120 which also serves the version desired by the client device 120.

Using FIG. 1E for the scenario in which different versions of the same website are provided to different client devices 120 using the same domain name, let's assume now that in there are two client devices 120: client device 120A known to be desirous to access version 1.0 of a REST API (e.g., network resource 162A) and client device 120B known to be desirous to access version 1.2 of a REST API (e.g., network resource 162B). The intent of the client devices 120A-B is part of their context 128 (e.g., client context 126), which can be explicitly given through the requests 124A-B (e.g., queries), assumed by the DNS server 110 and added to the context 128 when calling the function 146 and/or AI 147, or identified inside the function 146 and/or AI 147 by any other method (e.g., dynamic configuration file 142, dynamic variable 144) provided by the DA device 150. In this example, the system 100D has two lists of IPs: a list of IPs for host devices 160A providing version 1.0 of REST API (e.g., network resources 162A), and a list of IPs for host devices 160B providing version 1.2 of the REST API (e.g., network resources 162B). Once the function 146 and/or AI 147 has identified the intention of the client, the function 146 and/or AI 147 picks the most appropriate IP address (e.g., network resource 162A or 162B) for the context 128 of the client device 120, returning the IP (e.g., network resource 162) with the lowest latency relative to the client device 120 which also serves the version desired by the client device 120.

In some embodiments, the ultimate goal of a unified programmable dynamic context-aware configuration is to liberate the DNS Server 110 from the limitations imposed by static configuration files and unlock the potential of the DNS protocol to reduce resource consumption and enable a safer, smarter, and more efficient internet (e.g., network 130).

The unified programmable dynamic context-aware configuration may include a file (e.g., dynamic configuration file 142) that contains an algorithm (e.g., dynamic variable 144) defining the domain zone and zone record configurations for a given domain. It is possible for a single file (e.g., dynamic configuration file 142) to contain multiple domain zone configurations. It is also possible for a single file (e.g., dynamic configuration file 142) to contain the configuration of a single zone record or for multiple files to define a single domain zone, with each file (e.g., dynamic configuration file 142) containing a single zone record or any possible combination of files, domain zones, or zone record configurations.

FIGS. 2A-C illustrate dynamic configuration files 142, according to certain embodiments. FIGS. 2A-C may illustrate three of many possible variations of dynamic configuration files 142. Dynamic configuration file 142A of FIG. 2A may contain more than one domain zones configurations 202A-B, each one containing different multiple domain zone records 204A-D (e.g., dynamic variables 144). In some embodiments, a domain zone record 204 can be a static or dynamic configuration (e.g., depending on how defined by DA device 150). FIG. 2B illustrates a dynamic configuration file 142B that is a single configuration file containing a single domain zone configuration 202C that has multiple distinct domain record configurations 204E-F. FIG. 2C illustrates a dynamic configuration file 142C that contains distinct domain record configurations 204G-H that are not inside a clearly declared domain zone configuration 202. These examples demonstrate the flexibility of the system that allows a large combination of dynamic configuration file structures that allows the DA device 150 to properly dimension and separate configurations in a manner that works best for their specific setup.

For the sake of simplicity in this explanation, the term dynamic configuration file 142 may be used to denote a file that contains any of the following: functions; classes; objects; constants; variables (e.g., dynamic variables 144); comments; decorators; arrays; dictionaries; data structures; algorithms; or any other programming structures (written inside one or multiple files) that allows the programmatic and dynamic configuration of domain zones or records.

In some embodiments, the dynamic configuration file 142 may be created by the DA device 150 in the same manner that the DA device creates a domain zone configuration with static files, except that this unified programmable dynamic context-aware configuration allows the DA device 150 to define both static and dynamic zone record configurations.

A configuration file may be shown in Table 1.

TABLE 1

| | |
|---|---|
| 1: $TTL 3600 | |
| 2: @ | IN SOA ns1.example.com. admin.example.com. ( |
| 3: | 2023102402 |
| 4: | 3600 |
| 5: | 900 |
| 6: | 604800 |
| 7: | 3600 |
| 8: | } |
| 9: | |
| 10: @ | IN NS ns1.example.com. |
| 11: @ | IN NS ns2.example.com. |
| 12: @ | IN NS ns3.example.com. |
| 13: @ | IN NS ns4.example.com. |
| 14: | |
| 15: @ | IN A 45.23.129.8 |
| 16: @ | IN A 178.56.241.12 |
| 17: @ | IN A 202.7.89.154 |
| 18: @ | IN A 11.145.203.77 |
| 19: | |
| 20: www | IN CNAME example.com. |

The configuration file shown in Table 1 may be from a DNS server and may be a static configuration file. In this configuration file of Table 1, a fictitious but syntactically correct domain zone configuration for example.com is defined with various different types of domain zone records in the configuration file.

A substantially equivalent of the same configuration written using a unified programmable dynamic context-aware configuration file is shown in a dynamic configuration file 142 shown in Table 2.

TABLE 2

```
1: TTL_example_com = 3600
2:
3: function SOA__example_com(request):
4:     return {"serial_number": 2023102402,
5:         "refresh": TTL__example_com,
6:         "retry": 900,
7:         "expire": 604800,
8:         "default_ttl": TTL__example_com}
9:
10: function NS__example_com(request):
11:     return {"ns1.example.com",
12:         "ns2.example.com",
13:         "ns3.example.com",
14:         "ns4.example.com"}
15:
16: function A__example_com(request):
17:     return round_robin(request,
18:         {"45.23.129.8",
19:         "178.56.241.12",
20:         "202.7.89.154",
21:         "11.145.203.77"})22:
23: function CNAME__example_com(request):
24:     return "example.com"
```

The dynamic configuration file 142 of Table 2 may define substantially the same basic domain zone configuration for example.com but may allow for the valuation of context when an A query on example.com is sent against this authoritative nameserver. The example function A_example_com (request) (see line 16 of Table 2) is called with the request 124 and client context 126, and inside the function (e.g., dynamic variable 144), the DA device 150 decided that the response 114 should prioritize load balancing using the round_robin (see line 17 of Table 2) technique against the IPs of the available host devices 160 responsible for that domain name (see lines 18-21 of Table 2). That is a simple example of dynamic configuration. The programming language used in this dynamic configuration file 142 of Table 2 is just an example and the underlying language or syntax used is irrelevant to the concept of this present disclosure as long as the language provides the elements that allow for the unified programmable dynamic context-aware elements depicted throughout the present disclosure. The domain record configuration defined by the function SOA_example_com (request) (see lines 3-8 of Table 2) represents an example of static domain record configuration. No algorithmic elements inside the function alter the response based on a context. The same behavior is observed in the domain record configurations for NS_example_com (request) (see lines 10-14 of Table 2) and CNAME_example_com (request) (see lines 23-24 of Table 2). The domain record configuration defined by A_example_com (request) (see lines 16-21 of Table 2), however, depicts a dynamic configuration that rotates the response based on the context provided by the DNS server 110 through the request argument, letting the function round_robin ( ) (line 17 of Table 2) know how to evenly rotate the host devices 160 based on that context. The dynamic configuration file 142 also contains a variable called TTL_example_com (line 1 of Table 2) which has the same effect as the configuration $TTL (line 1 of the static configuration file Table 1). In summary, the dynamic configuration file 142 of Table 2 illustrates an example of how a domain zone and domain zone records may be configured using a unified programmable dynamic context-aware configuration language.

A dynamic zone record configuration varies in behavior based on the context in which a query is executed. Another simplistic example would be a domain zone record containing IP addresses for multiple host devices 160 spread around the world. The dynamic zone record configuration is capable of evaluating the context of the query, understanding which IP addresses would yield the lowest latency for the client, and returning that single IP address as a response to the query. The dynamic nature lies in its ability to make a real-time decision based on any number of factors that the DA device 150 pre-determined at the time the domain record was created.

In some embodiments, a dynamic configuration file 142 may be illustrated in Table 3.

TABLE 3

```
1: function A__example_com(request):
2:          return closest_of(request,
3:              {"45.23.129.8",
4:              "178.56.241.12",
5:              "202.7.89.154",
6:              "11.145.203.77"})
```

Dynamic configuration file 142 of Table 3 shows how a unified programmable dynamic context-aware domain zone record configuration function called A_example_com (request) (lines 1-6 of Table 3) would be written in a such way that it would return only one IP address from a list of host devices 160 (lines 3-6 of Table 3) that is the closest to the IP address of the client device 120 who issued the request 124 (e.g., query), as stored in the request 124 (lines 1-2 of Table 3) provided to the function as an argument and passed along to another function called closest_of (line 2 of Table 3) that compares the geographical location of the client device 120 with the geographical location of all host devices 160 in the list provided, returning the IP address, host device 160, and/or network resource 162 that would provide the lowest latency relative to the client device 120.

A static zone record configuration, in contrast, is a conventional configuration that never evaluates the context and always resolves to the same value. Despite being a programmable configuration, the function returning the response could be static, as not all domain record configurations need a dynamic evaluation at runtime.

In some embodiments, a configuration file 142 may be illustrated in Table 4.

TABLE 4

```
1: function CNAME__example_com(request):
2:     return "example.com"
```

Dynamic configuration file 142 in Table 4 may be an example of a simple static domain zone record configuration named CNAME_example_com (request) (lines 1-2 of Table 4) using the unified programmable dynamic context-aware configuration language. Although the function (e.g., dynamic variable 144) receives the request as an argument (line 1 of Table 4), the function does not make use of the context anywhere inside the function and the function returns a value that is effectively a constant (line 2 of Table 4), never changing regardless of the state in which the configuration is run. The examples in Tables 1-4 illustrate the power and flexibility of a unified programmable dynamic context-aware configuration language that allows for the definition of static and dynamic configurations, permitting the better accommodation of needs and scales across a larger range of use cases while retaining simplicity and easiness of use.

After creating a dynamic configuration file 142 for a domain zone that the DA device 150 controls, the DA device 150 submits the dynamic configuration file 142 to the DNS server 110. The DNS server 110 performs checks on the dynamic configuration file 142, and if the dynamic configuration file 142 is in proper working condition, the domain zone configuration becomes available to receive requests 124 (e.g., queries) through the DNS server 110.

FIGS. 3A-G illustrate systems 300A-G associated with unified programmable dynamic context-aware configurations, according to certain embodiments.

Figure 3A:
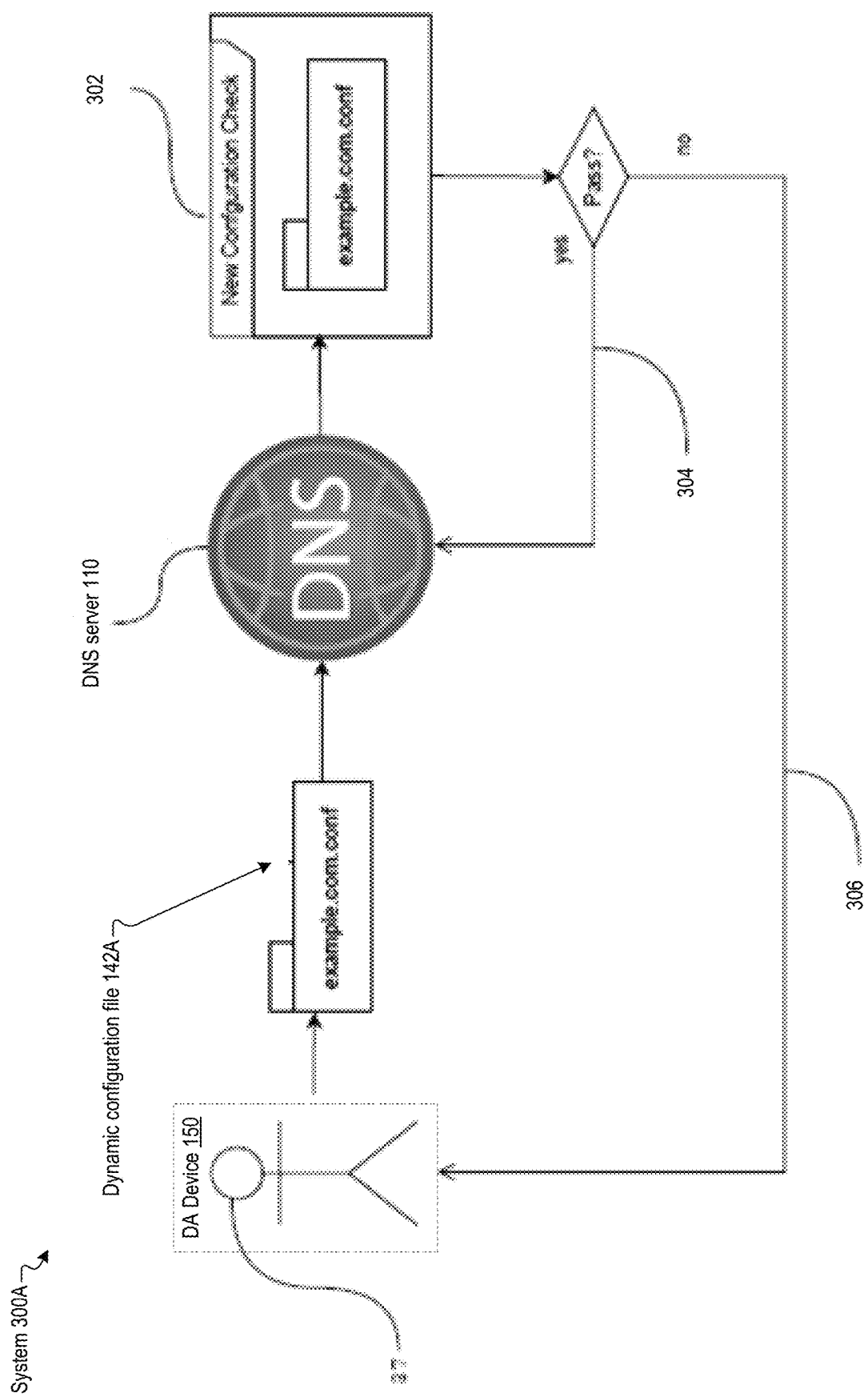

FIG. 3A may provide a schematic depiction of submitting a new dynamic configuration file 142 to the DNS server 110. DA device 150 may generate (e.g., writes) a new dynamic configuration file 142 for the domain example.com named example.com.conf which contains some or all of the relevant domain zone configurations for that domain. The DA device 150 then submits this new configuration for deployment with the DNS Server 110. Before proceeding with the deployment of the dynamic configuration file 142, which contains algorithms (e.g., dynamic variables 144) that could contain bugs, malicious code, or be syntactically incorrect, the DNS server 110 offloads the verification process to a process 302 (e.g., an external isolated process, an internal process, etc.) which then performs all verifications. If the new configuration passes all checks, it is deployed with the DNS Server 110 (see flow 304), replacing any previous configuration if any existed previously. If the new configuration fails any of the checks (see flow 306), the DA device 150 receives a detailed message explaining which checks failed and the new configuration is discarded without being submitted for deployment with the DNS Server 110. There are more elements in this process, which will be explained in more details later in this document.

Upon receiving a request 124 (e.g., query) for which the DNS server 110 is an authoritative nameserver with a unified programmable dynamic context-aware configuration file (e.g., dynamic configuration file 142) for the domain in the request 124 (e.g., query), the DNS server 110 will perform several tasks to handle and respond to the request 124 (e.g., query) properly. In some embodiments, the operations (e.g., core operations) may include one or more of:

1. Check the cache in memory.
2. Failing to retrieve from the cache, the DNS server 110 refers to in-memory index of the DNS server 110 to know which dynamic configuration file 142 should be used to answer this request 124 (e.g., query).
3. The dynamic configuration 142 file is loaded, the appropriate function (e.g., dynamic variable 144) that handles the specific domain record is called, and the context (e.g., client context 126) of the request 124 (e.g., query) is passed on to the function as an argument.
4. The function will perform computation of the function and return the response 114 to the caller (e.g., client device 120).
5. If the domain record configuration is of a static nature, the response 114 is stored in the cache (e.g., of the DNS server 110) with the indicated expiration set by the time-to-live (TTL) defined by the DA device 150 for the record (e.g., network resource 162). If the function is of a dynamic nature, the DA device 150 can choose to cache the response 114 based on context rules.

6. The response 114 is sent back to the client device 120.

Figure 3B:
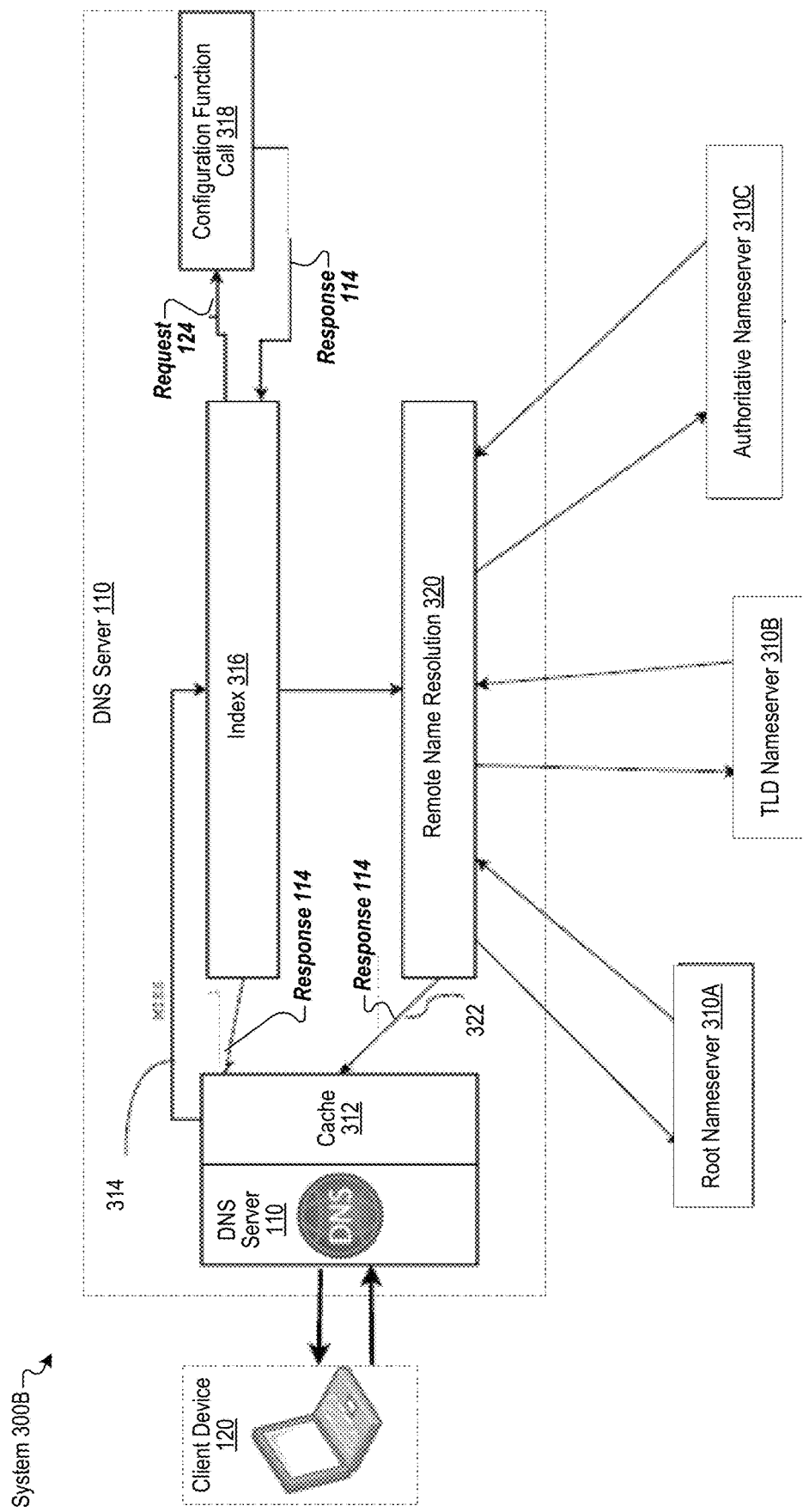

FIG. 3B illustrates a system 300B associated with unified programmable dynamic context-aware configuration, according to certain embodiments. FIG. 3B may provide a schematic description of how a DNS server 110 integrated with a unified programmable dynamic context-aware configuration language would process a request 124 (e.g., query) from a client device 120 under two possible scenarios: first when the DNS Server 110 is the authoritative name server for the domain in the request 124 (e.g., query), second when the DNS Server 110 is not the authoritative name server for the domain in the request 124 (e.g., query) and it uses the DNS protocol to resolve the request 124 (e.g., query) by finding the authoritative nameserver 310A-C for the domain and uses it to respond the client device 120.

In the first scenario, the client device 120 directly queries the DNS server 110 which also happens to be the authoritative name server for the domain in the request 124 (e.g., query). If the request 124 (e.g., query) is stored in cache 312 the answer is returned substantially immediately without passing the request 124 (e.g., query) any further. If the response 114 is not cached (see flow 314), the DNS server 110 checks its index 316 to find whether the queried domain is in one of the dynamic configuration files 142. In this scenario, the request 124 (e.g., query) can be resolved with one of the indexed configurations and the request 124 (e.g., query) and client context 126 are passed on to the domain zone record configuration function 318 which will process the request 124 (e.g., query) with the given client context 126 and return a response 114 back to the caller, which is then returned back to the client device 120. At some point, the response 114 is also stored in the cache 312 for faster retrieval next time that a new request 124 (e.g., query) is a cache hit.

In the second scenario, the client device 120 directly queries the DNS server 110 which is not the authoritative name server for the domain in the request 124 (e.g., query). If the request 124 (e.g., query) is stored in cache 312 the answer is returned immediately without passing the request 124 (e.g., query) any further. If the response 114 is not cached (see flow 314), the DNS server 110 checks the index 316 of the DNS server 110 to find whether the queried domain is in one of the dynamic configuration files 142. In this scenario, the request 124 (e.g., query) cannot be resolved with one of the indexed configurations and the DNS server 110 starts the process of resolving the name (e.g., remote name resolution 320) through the DNS protocol by first checking with the Root name server 310A for the location of the relevant top-level domain (TLD) nameservers 310B for the domain in the request 124 (e.g., query). With the location of the TLD nameservers 310B, the DNS server 110 then queries one of the TLD nameservers 310B for the location of the authoritative nameservers 310C for the domain in the request 124 (e.g., query). With the location of the authoritative nameservers 310C, the DNS server 110 then forwards the request 124 (e.g., query) to the authoritative nameservers 310C, receives a response 114 for that request 124 (e.g., query), and passes the response 114 back (see flow 322) to the client device 120. At some point, the response 114 is also stored in the cache 312 for faster retrieval next time that a new request 124 (e.g., query) is a cache hit.

FIG. 3B illustrates a system 300B associated with unified programmable dynamic context-aware configuration, according to certain embodiments. FIG. 3B may illustrate how the unified programmable dynamic context-aware configuration-enabled DNS server 110 is fully compatible with the DNS protocol and capable responding to all types of requests 124 (e.g., DNS queries) regardless of whether or not the requests 124 are queries to a domain for which the DNS server 110 is an authoritative nameserver.

The dynamic configuration file 142 can be loaded in different ways. A few of them are by calling them as a separate process, as a thread, importing and running inside the same environment, performing a remote call, using sockets for communication, or even running the configuration program in a sandboxed and isolated environment. The decision on how to execute the configuration program is based on the programming language capabilities, user requirements, and level of trust between the DNS service provider and the DA device 150.

The dynamic configuration file 142 can also be loaded in memory 326 and remain available at runtime throughout the life of the process of the DNS server 110, or it could be loaded on demand and removed from memory immediately or sometime after the response is produced.

Figure 3C:
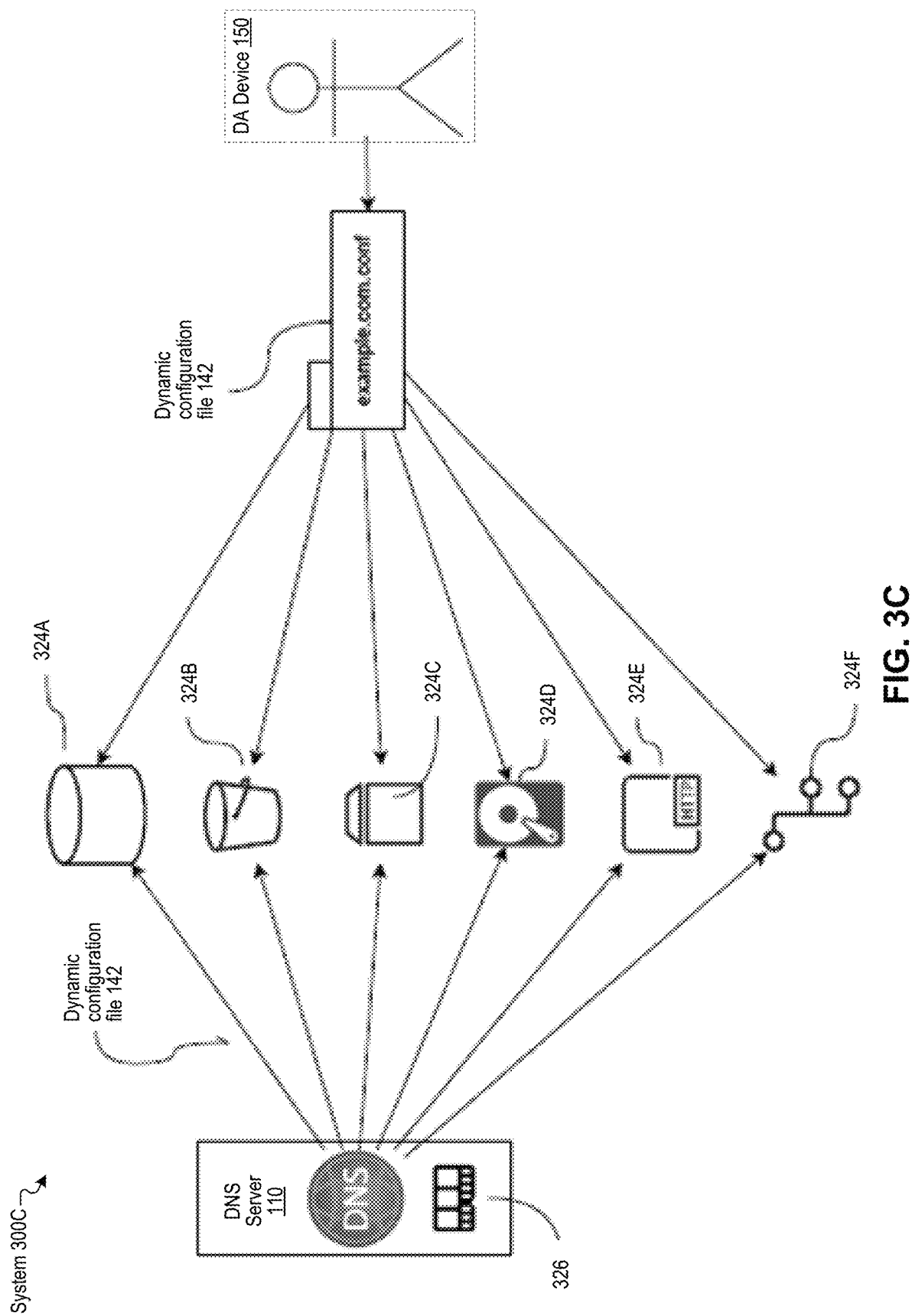

FIG. 3C illustrates some of the various ways in which the DNS Server 110 is capable of receiving new dynamic configuration files 142 from the DA device 150. Among multiple storage solutions, FIG. 3C lists the following alternatives as examples:

1. Relational and non-relational databases 324A can be used to store the contents of a dynamic configuration file 142. The manner in which this dynamic configuration file 142 is structured inside the database can vary, but in summary, the DNS Server 110 is able to query the database 324A and notice any configuration changes.

2. Object storage services 324B

3. Network Attached Volumes 324C

4. Local Hard or Solid State Disks 324D

5. Remote Web Server or API endpoint 324E that returns the dynamic configuration file 142 upon receiving an HTTP/S request.

6. Version control systems/repositories 324F such as Git, Subversion (SVN), Concurrent Versions System (CVS), etc.

Regardless of which alternative is used, it may be referred to as a configuration repository 324 as the place where the DNS Server 110 is configured to look for new dynamic configuration files 142.

Upon adopting a new configuration, the DNS Server 110 may be configured to keep the dynamic configuration file 142 stored in the configuration repository 324 or have the dynamic configuration file 142 loaded in memory 326 as a text, compiled application, byte code, containerized, or any other convenient format for fast retrieval and execution.

The form by which the DNS Server 110 determines whether there has been a change in the dynamic configuration file 142 includes but is not limited to: comparing the computed hash of existing configuration against the equivalent dynamic configuration file 142 in the configuration repository 324; comparing deltas between files (e.g., dynamic configuration files 142); and/or comparing the file creation or change date, or alternatives as simple as setting up flag attributes that manually indicate that a dynamic configuration file 142 has been changed.

In the dynamic configuration file 142, it is also possible that the DA device 150 had configured pre and post-processing filters. A pre-processing filter is a function that is executed immediately before calling the domain record configuration function. The pre-processing filter is capable of manipulating the request 124 (e.g., query), the client context 126, or performing substantial identical routine algorithms that are to be performed against all or several domain records. The pre-processing filter is not a requirement but is made available to allow the DA device 150 to develop a more reusable and maintainable dynamic configuration file 142. After the pre-processing filter, the domain record function is called and the adjustments made by the pre-processing filter are available to the domain record function. Upon returning, a response 114 is also subject to being manipulated by a post-processing filter before the final response 114 is sent back to the DNS server 110. This post-processing has a similar goal as the pre-processing filter, except that the post-processing filter has the ability to manipulate the response 114 before the response 114 is sent back to the DNS Server 110, whereas the pre-processing filter is intended to manipulate the request 124 (e.g., query) before the request 124 is sent to the domain zone record function (e.g., dynamic variable 144).

FIGS. 3D-E illustrate system 300D-E associated with unified programmable dynamic context-aware configurations, according to certain embodiments. FIGS. 3D-E illustrate two of the many possible uses of pre- and post-processing filters in dynamic configuration files 142.

FIG. 3D illustrates how optional distinct pre-processing filters 328A-C can be added in front of each respective domain zone record configuration function 146A-C. It further depicts the optional use of distinct post-processing filters 329A-C receiving the return of each respective domain zone record configuration function 146A-C for processing before returning the final response back to the Index 315, which then returns it to the main DNS Server 110 process to be finally returned back to the client device 120.

FIG. 3E illustrates another possible application of pre- and post-processing filters. In this example, the DA device 150 has prepared a single generic pre-processing filter 328 that is meant to intercept all requests and treat them prior to sending them to select domain zone record configuration functions 146A-C. The DA device 150, in this example, has also set up a single generic post-processing filter 329 responsible for intercepting the return of all domain zone record configuration functions 146A-C and performing post-processing operations before sending the final response back to the Index 315, which then passes it back to the main DNS server 110 process so it can find its way back to the client device 120.

A combination of these scenarios is also possible, with some pre-processing filters 328 interfacing with a single domain zone record configuration function while another pre-processing filter 328 interfaces with multiple distinct domain zone record configuration functions. The use of a pre-processing filter 328 does not require the use of a post-processing filter 329 for the same domain zone record configuration function and vice-versa.

A DA device 150 can label a domain zone record configuration as static, fully dynamic, or semi-dynamic. The DNS server 110 may always try to cache the responses 114, but there is a difference in behavior between the types of domain zone record functions. A static function is substantially always cached after responding successfully, following the expiration time defined by the DA device 150 in the TTL. A fully dynamic function is cached with a strict context, also following the expiration defined by the DA device 150 in the TTL. In order for a strict context to be a cache hit, the context must strictly match with the cached response. In a semi-dynamic function, the DA device 150 can configure what parts of the context must be a match for a cache hit. Since cached responses offer significantly lower latency over running a domain zone record function to retrieve the response, the DA device 150 has the ability to fine-tune how caching is done to each domain zone record to maximize performance and other goals.

Figure 3F:
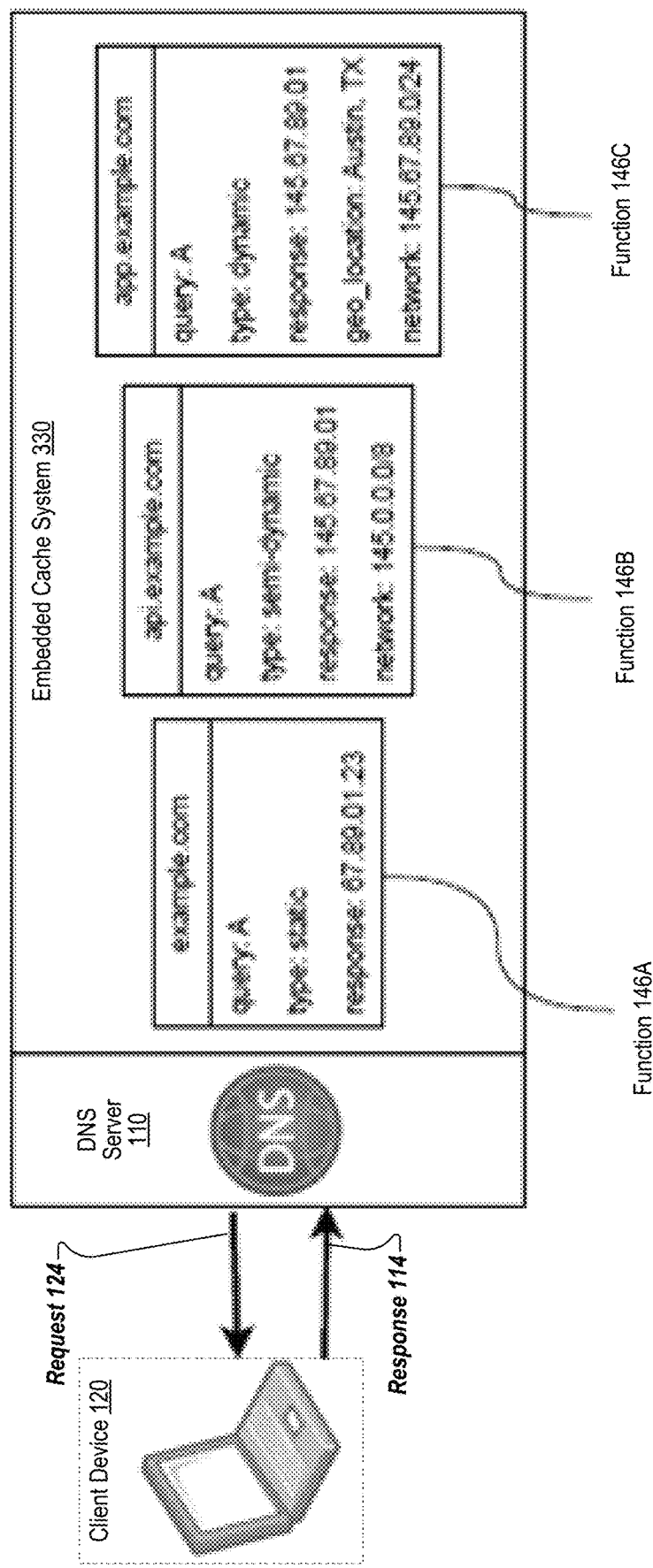

FIG. 3F illustrates a system 300F associated with unified programmable dynamic context-aware configuration, according to certain embodiments. FIG. 3F shows an example of a DNS Server 110 with an embedded cache system 330 that keeps available the most recent unexpired responses from domain zone record configuration function responses and makes them more readily available to queries received by a client device 120. In this example, one of the cached responses is from a static domain zone record configuration function 146A. Any client device 120, from anywhere in the world, querying a name resolution for an A record on example.com will be served a response 114 directly from the cache of function 146A regardless of their context because the original domain zone record configuration function was also static and the response 114 would not have changed based on the context of the client device 120. This may be the current behavior observed in all DNS servers. Another cached response in FIG. 3F is from a semi-dynamic domain zone record configuration function 146B. Clients devices 120 that have an IP address inside the 145.0.0.0/8 network range querying a name resolution for A record on api.example.com will receive a response 114 straight from the cache of function 146B no matter where they're located in the world. The cache system mimics the behavior of the domain zone record configuration function that generated the cached response. If a client device 120 that has an IP in any other network queries this DNS server 110 for an A record on api.example.com, the client device 120 may not receive a response 114 from the cache. Instead, the DNS Server 110 may consider the request 124 (e.g., query) a cache miss and may proceed with processing as previously demonstrated in FIG. 3B (flow 314). Another cached response in FIG. 3F is from a dynamic domain zone record configuration function 146C. In this case, only client devices 120 that are geolocated in Austin Texas, and have an IP address within the network 145.67.89.0/24 querying a name resolution for A record on app.example.com will be served a response straight from the cache. Everyone else, even client devices 120 within that network but outside of Austin Texas are going to follow the regular response processing described in FIG. 3B (flow 314). This cache system gives the DA device 150 the ability to use a unified programmable dynamic context-aware configuration language while at the same time making smart use of cache systems to reduce latency where possible without compromising on some aspects of the dynamic nature of the system.

As for the programming language used for the DNS Server 110 or the dynamic configuration files 142, the programming languages could be similar or dissimilar, interpreted, compiled, run inside a Java virtual machine (JVM), run inside a container, or executed under any other runtime environment. In some embodiments, the dynamic configuration file 142 is accessible by the DNS Server 110, and the DNS server 110 has the capability to process a request 124 (e.g., query) through the dynamic configuration file 142 and extract the response 114 that the DA device 150 intended for a given context (e.g., client context 126). The programming language may afford all the conveniences that a regular programming language provides to a software engineer. The DA device 150 may not be required to use any of these capabilities if the capabilities are not required. Examples of capabilities and conveniences include, but are not limited to:
  1. Communication with databases and other backend services;
  2. Exception handling;

3. Use of appended hardware such as Network Interface Cards, GPUs, Storage devices, and others;
4. Ability to interface with various application programming interfaces (APIs);
5. Multi-threading and concurrency control;
6. Access to system-level functions and configurations;
7. Dynamic memory allocation and garbage collection;
8. Integration with external libraries or frameworks;
9. Object-oriented programming features like inheritance, polymorphism, and encapsulation;
10. Support for cryptographic functions and security protocols;
11. Conditional statements, loops, and other control structures;
12. File system operations such as reading, writing, and streaming;
13. Data serialization and deserialization capabilities;
14. Support for regular expressions and text manipulation functions;
15. Real-time data processing and event-driven programming features;
16. Networking capabilities for sending, receiving, and processing data packets;
17. Use of various data structures like arrays, lists, dictionaries, and trees;
18. Ability to interact with other software components through middleware;
19. Integration with logging, monitoring, profiling, tracing, and debugging tools;
20. Support for internationalization and localization features;
21. Procedural, functional, declarative, logic, imperative, or array programming features;
22. Event-driven or data-driven programming features;
23. All other features and capabilities found in low and high-level programming languages.

In some embodiments, the DA device 150 can implement and configure health checks for host devices 160 referred to in the domain zone configuration. These health checks are performed regularly at scheduled intervals according to the configuration provided by the DA device 150 determining the format of the health check and the interval in which it should be executed. Host devices 160 that fail the health check are made unavailable for name resolution until the host devices 160 become healthy again, as confirmed by the health check configuration provided by the DA device 150.

Figure 3G:
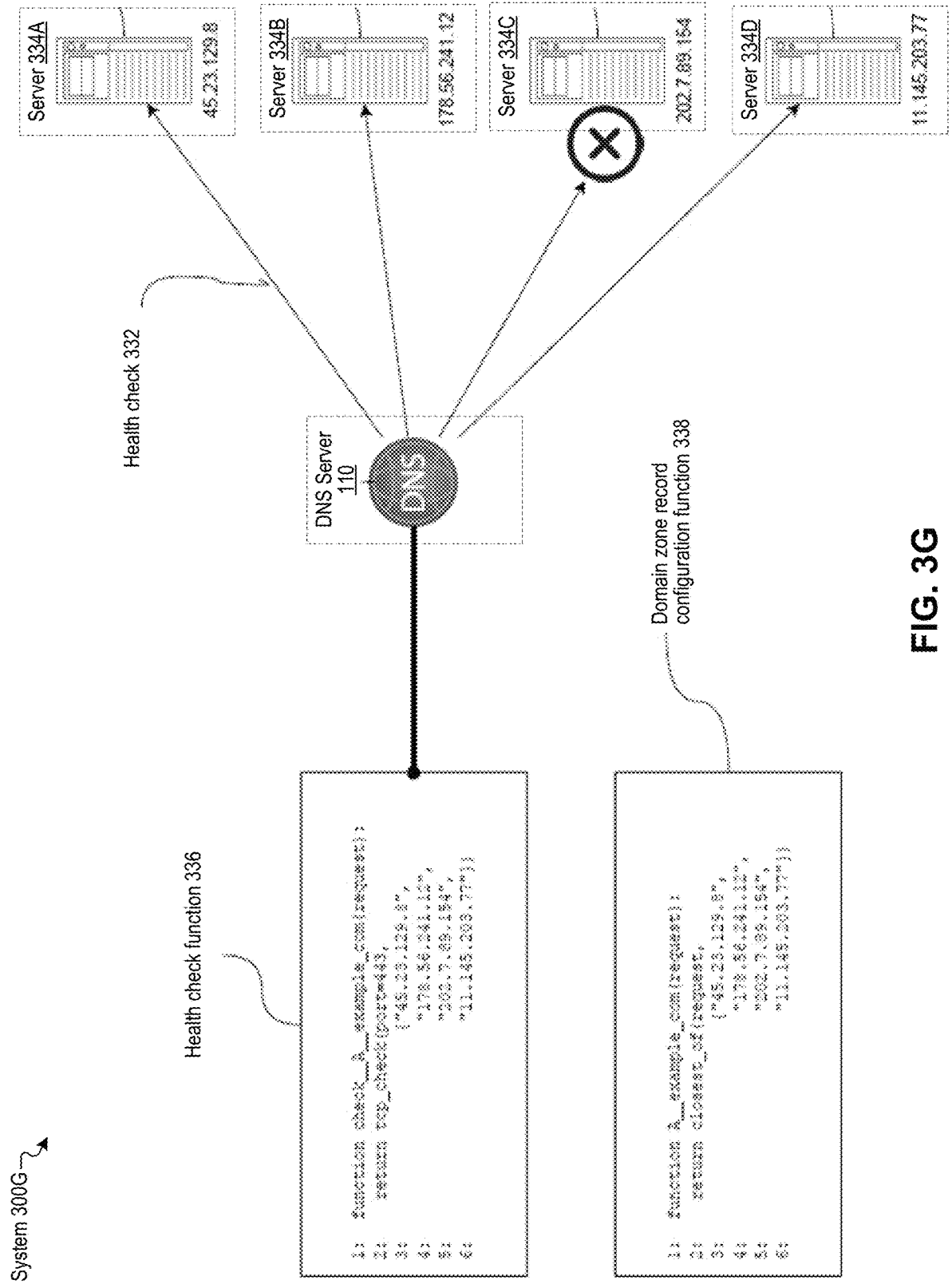

FIG. 3G illustrates a system 300G associated with unified programmable dynamic context-aware configuration, according to certain embodiments. FIG. 3G illustrates a DNS Server 110 health check function 336 (see lines 1-6) which defines the manner in which the DNS Server 110 performs health checks 332 against a series of servers 332A-D (e.g., host devices 160) registered in one of the domain zone record configuration functions 338 for which the DNS Server 110 is an authoritative nameserver. In this example, one of the servers 334C became unavailable, and that was detected by the DNS Server 110. Upon detecting that one of the servers 334C has become unhealthy, the DNS Server 110 temporarily and automatically removes that server from name resolutions, and automatically adds the host back in once it becomes healthy again.

In some embodiments, the DA device 150 would be able to write test suites to check each one of the domain zone record configurations. This feature allows for the DA device 150 to allow that substantially up to 100% of the domain zone configuration is covered with tests and that substantially all configuration conforms to the standards required by the business. The test suite can be provided inside the dynamic configuration file 142, or through separate test files. The advantage of providing the test suite separate from the dynamic configuration files 142, is that the DA device 150 has the ability to set up the tests and allow other members of the team to create the domain zone record configurations without also giving the ability to change the test suites. For this application, the tests of the DA device 150 are able to allow (e.g., guarantee) that the domain zone record configurations are following pre-determined standards and that the team member didn't introduce bugs, malicious code, or otherwise infringe on pre-determined rules and namespacing for the domain zone configuration. On the other hand, the DA device 150 may also allow other team members to implement their own domain zone records and test suites to confirm their behavior will perform as expected.

An example of a test case is shown in Table 5.

TABLE 5

```
1: function A__example_com(request):
2:         return closest_of(request,
3:             {"45.23.129.8",
4:              "178.56.241.12"})
7:
8: function test_A_example_com():
9:         mock_request = Request("45.23.130.42")
10:        check(A__example_com,
11:            mock_request,
12:            "45.23.129.8")
13:
14:        mock_request = Request("178.56.2.58")
15:        check(A__example_com,
16:            mock_request,
17:            "178.56.241.12")
18:
19: function check__A__example_com(request):
20         return tcp_check(port=443,
21:            {"45.23.129.8",
22:             "178.56.241.12",
23:             "202.7.89.154",
24:             "11.145.203.77"})
```

Table 5 is a simplified test case that confirms that the domain zone record configuration function A_example_com (lines 1-4 of Table 5) returns the appropriate IP address based on the location of the client device 120 in each one of the mock requests (lines 9, 14 of Table 5). Still in Table 5, it is possible to observe the presence of a health check function (lines 19-24 of Table 5) called check_A_example_com which defines that health checks should be performed by testing whether port 443 is open (line 20 of Table 5) in the given list of host IP addresses (lines 21-24 of Table 5).

A substantially similar example may be illustrated in Tables 6-8, yielding substantially the same result (e.g., the exact same result) but separating the test case (Table 7), the health check function (Table 8), and the domain zone configuration (Table 6) into different files. Other more complex test cases and health checks can be implemented to test for other behaviors depending on the needs of the DA device 150.

TABLE 6

```
1: function A__example_com(request):
2:         return closest_of(request,
3:             {"45.23.129.8",
4:              "178.56.241.12"})
```

TABLE 7

```
1: function_test__A__example_com( ):
2:          mock_request = Request("45.23.130.42")
3:          check(A__example_com,
4:              mock_request,
5:              "45.23.129.8")
6:
7:          mock_request = Request("178.56.2.58")
8:          check(A__example_com,
9:              mock_request,
10:             "178.56.241.12")
```

TABLE 8

```
1: function check__A__example_com(request):
2:          return tcp_check(port=443,
3:              {"45.23.129.8",
4:              "178.56.241.12",
5:              "202.7.89.154",
6:              "11.145.203.77"})
```

In some embodiments, the DNS server 110 is capable of separating configuration, health check, and test suite file changes into revisions. This allows for the DA device 150 to keep track of all changes made to the domain zone configuration and enables easy rollback of the dynamic configuration files 142 and test suites to a previous version. The DNS server 110 would also allow the DA device 150 to verify the differences between the dynamic configuration files 142 and test suite files when needed.

Tables 9-11 and Tables 12-14 depict two different configuration revisions for the domain zone example.com.

TABLE 9

```
1: function A__example_com(request):
2:          return closest_of(request,
3:              {"45.23.129.8",
4:              "178.56.241.12"})
```

TABLE 10

```
1: function test__A__example_com( ):
2:          mock_request = Request("45.23.130.42")
3:          check(A__example_com,
4:              mock_request,
5:              "45.23.129.8")
6:
7:          mock_request = Request("178.56.2.58")
8:          check(A__example_com,
9:              mock_request,
10:             "178.56.241.12")
```

TABLE 11

```
1: function check__A__example_com(request):
2:          return tcp_check(port=443,
3:              {"45.23.129.8",
4:              "178.56.241.12"})
```

TABLE 12

```
1: function A__example_com(request):
2:          return closest_of(request,
3:              {"202.7.89.154",
4:              "11.145.203.77"})
```

TABLE 13

```
1: function test__A__example_com( ):
2:          mock_request = Request("202.3.0.91")
3:          check(A__example_com,
4:              mock_request,
5:              "202.7.89.154")
6:
7:          mock_request = Request("11.145.3.89")
8:          check(A__example_com,
9:              mock_request,
10:             "11.145.203.77")
```

TABLE 14

```
1: function check__A__example_com(request):
2:          return tcp_check(port=443,
3:              {"202.7.89.154",
4:              "11.145.203.77"})
```

The first configuration revision (Tables 9-11) is an old revision that pointed to old IP addresses (Table 9, lines 3-4; Table 10, lines 5, 10; Table 11, lines 3-4) that the DA device 150 is planning to retire. Upon receiving the necessary changes from the DA device 150 to the domain zone record configuration (Table 12), test suite (Table 13), and health check (Table 14) files, the DNS Server 110 creates a new revision for this new set of files to perform sanity checks, execute the test suite, health checks, and confirm that the new configuration is ready for deployment. Any number of revisions can co-exist inside the same DNS server 110, but that may not mean that all of the revisions are to be active. Moreover, more than one revision can be active at the same time if the DNS server 110 is implementing traffic directing or performing coordinated rollout strategies.

In some embodiments, the DNS server 110 has a dynamic configuration file watcher. This file watcher monitors the configuration source for configuration, health checks, and test suite file changes. Once changes are detected, the DNS server 110 attempts to deploy the changes by first creating a new revision for the new files, then verifying that there are no syntax errors in those dynamic configuration files 142 and that they're in apparent good working condition. If the dynamic configuration files 142 fail this check, the changes are ignored and an error is generated. If the changes pass this sanity check and test suites are provided, the DNS server 110 will execute the tests. All tests are to pass for the configuration to be accepted into production. If any test fails, an error message is generated and the changes are ignored. If all tests pass, or if no tests were provided by the configuration passed sanity checks, the DNS server 110 performs all health checks according to the specifications of the DA device 150. If at least one server for each domain record zone with a health check configuration passes the health check, the new revision is substantially immediately deployed to production. If at least one domain zone record configuration is left without healthy hosts, the new revision will remain pending until at least one host is confirmed healthy. If after deployment, any of the domain zone records throw an error during execution, the DNS server 110 is to substantially automatically generate an error message and revert the configuration files back to the latest working revision.

Figure 4A:
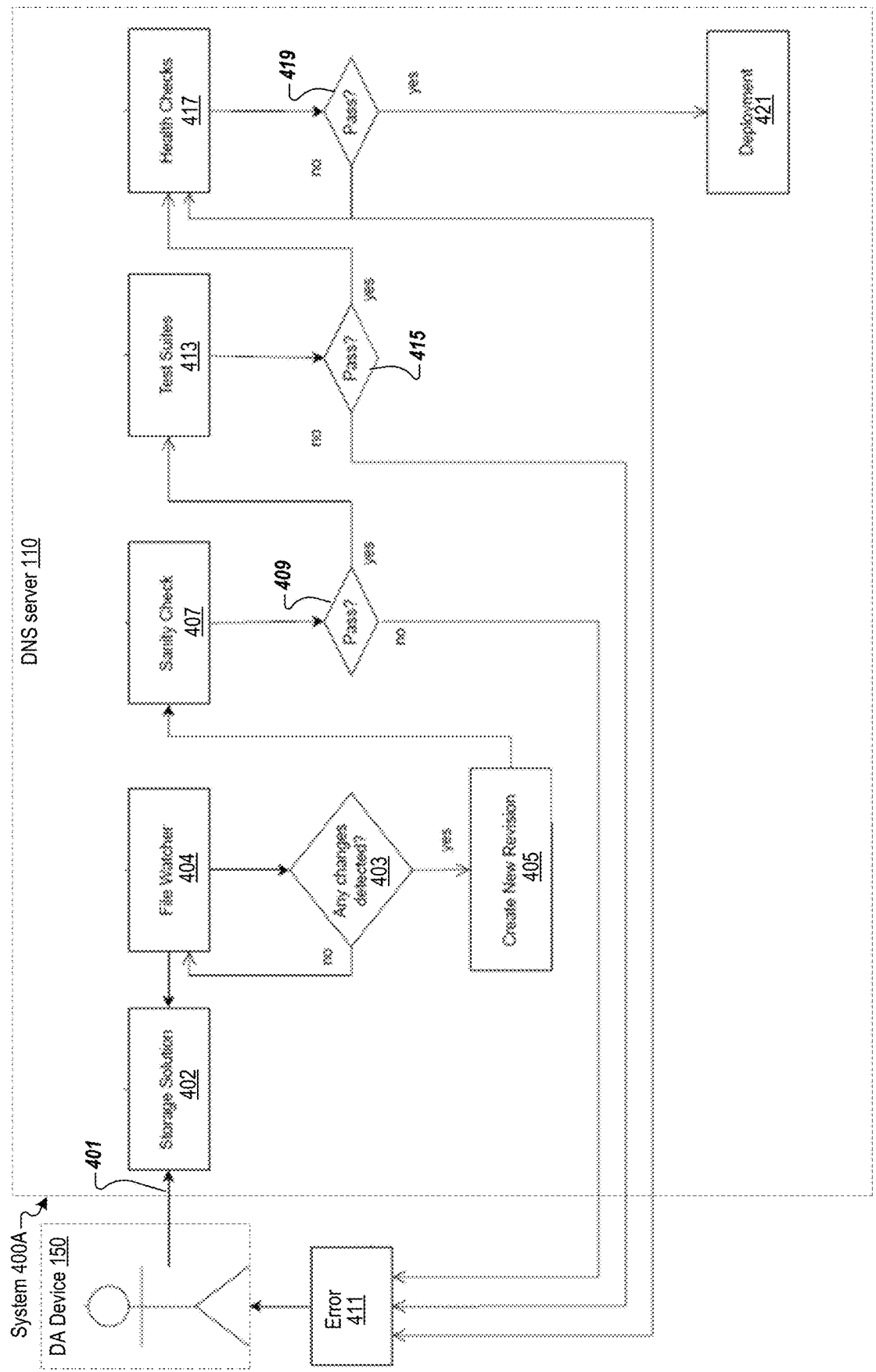
FIGS. 4A-B illustrate flow diagrams of methods associated with unified programmable dynamic context-aware configurations, according to certain embodiments.
Figure 4B:
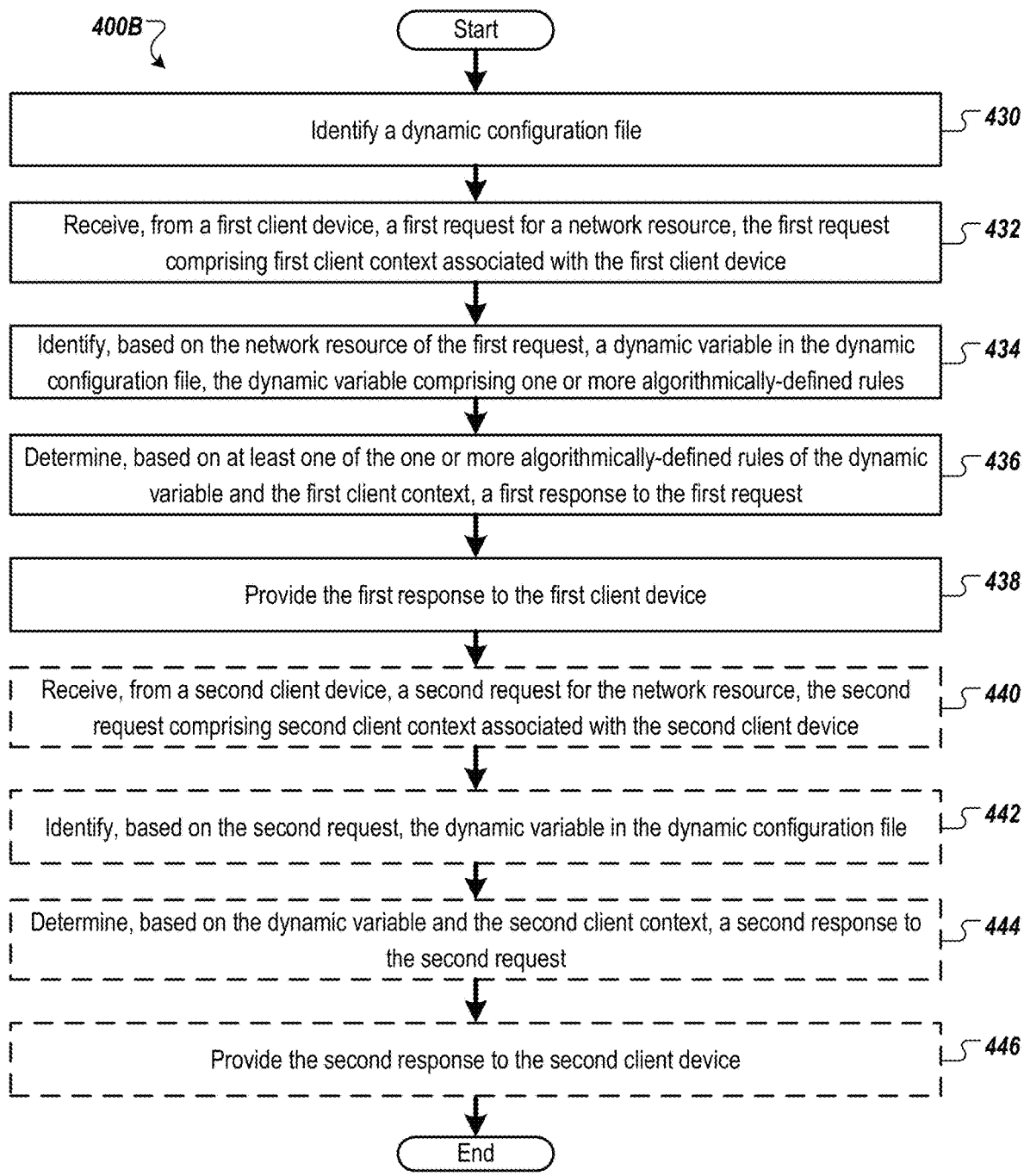

FIGS. 4A-B illustrate flow diagrams of methods 400A-B associated with unified programmable dynamic context-aware configurations, according to certain embodiments. In some embodiments, one or more operations of one or more of methods 400A-B are performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiment, one or more operations of one or more of methods 400A-B are performed, at least in part, by a device (e.g., DNS server 110, DA device 150, client device 120, processing device, etc.) of one or more of FIGS. 1A-1D, 3A-G, or 5A-C of the present disclosure. In some embodiments, a non-transitory machine-readable storage medium stores instructions that when executed by a processing device, cause the processing device to perform one or more operations of one or more of methods 400A-B.

For simplicity of explanation, one or more of methods 400A-B is depicted and described as a series of operations. However, operations in accordance with this disclosure can occur in various orders and/or concurrently and with other operations not presented and described herein. Furthermore, in some embodiments, not all illustrated operations are performed to implement one or more of methods 400A-B in accordance with the disclosed subject matter. In addition, those skilled in the art will understand and appreciate that one or more of methods 400A-B could alternatively be represented as a series of interrelated states via a state diagram or events.

Referring to FIG. 4A, at block 401, processing logic (e.g., of DNS server 110) receives (e.g., from DA device 150) changes to dynamic configuration file 142. Processing logic may receive the changes to the dynamic configuration file 142 at a storage solution 402 (e.g., of DNS server 110) monitored by the file watcher 404 (e.g., of DNS server 110).

At block 403, processing logic determines whether changes are detected. Responsive to determining no changes, flow returns to file watcher 404 motoring storage solution 402 for changes to dynamic configuration file 142 received at block 401. Responsive to determining there are changes in the dynamic configuration file 142, flow continues to 405 where processing logic (e.g., via file watcher 404) causes creation of a new revision.

At block 407, processing logic (e.g., via file watcher 404) performs a sanity check.

At block 409, processing logic determines whether the new revision passes the sanity check. Responsive to not passing the sanity check (e.g., the sanity check failing), flow proceeds to block 411 where an error is generated and provided to DA device 150 (e.g., DA device 150 is notified and the revision remains inactive).

Responsive to passing the sanity checks, flow proceeds to block 413 where processing logic executes the test suites, if any are provided in this revision.

At block 415, processing logic determines whether the revision passes the test suites. Responsive to not passing any of the test suites (e.g., if any of the test cases fail), flow proceeds to block 411 and an error is generated and the DA device 150 is notified.

Responsive to passing all of the test suites (e.g., if all of the test cases pass), flow proceeds to block 417 where processing logic begins executing the health checks if any were provided in this revision.

At block 419, processing logic determines whether the revision passes the heath checks. Responsive to not passing any of the health checks (e.g., if at least one health check fails with no healthy servers), flow continues to block 411 and an error is generated and DA device 150 is notified and block 417 of executing the health checks continue in a loop until the host devices 160 become available. As soon as at least one host device 160 for each health check is healthy (e.g., at block 417, processing logic executes health checks and at block 419, processing logic determines a host device 160 passes all of the health checks).

Responsive to passing the health checks (e.g., if at least one host device 160 for each health check passes the health check), at block 421 processing logic deploys the new revision to production.

In some embodiments, the DA device 150 can define rollout strategies for new revisions. A DA device 150 could, for example, instruct the DNS server 110 to serve one revision to clients in Europe, while another revision would be used for the rest of the world. It is also possible to define that a certain revision will be randomly served to a predetermined proportion of the traffic, while another revision is served to the remainder of the traffic. It would also be possible to allow multiple revisions to be served at the same time, with different proportions or rules, according to the instructions provided by the DA device 150.

FIG. 4B illustrates a flow diagram of a method 400B associated with a unified programmable dynamic context-aware configuration, according to certain embodiments. Method 400B may be performed by processing logic of DNS server 110.

At block 430 of method 400B, processing logic (e.g., of a DNS server 110) identifies a dynamic configuration file 142.

At block 432, processing logic receives, from a first client device 120A, a first request 124A for a network resource 162. The first request 124A includes first client context 126A associated with the first client device 120A. In some embodiments, the network resource 162 is a domain record, media file, or other content item.

At block 434, processing logic identifies, based on the network resource 162 of the first request 124A, a dynamic variable 144 in the dynamic configuration file 142. The dynamic variable 144 includes one or more algorithmically-defined rules.

At block 436, processing logic determines, based on at least one of the one or more algorithmically-defined rules of the dynamic variable 144 and the first client context 126A, a first response 114A to the first request 124A. In some embodiments, the algorithmically-defined rule could determine the response stochastically (e.g. Random selection, etc.) or deterministically (e.g. Round-robin, Proximity-based selection, etc.), based on the client context 126A.

At block 438, processing logic provides the first response 114A to the first client device 120A. In some embodiments, the first client device 120A is to access a first instance of the network resource 162 based on the first response 114A.

In some embodiments, the first request 124A is associated with resolving a domain name to access the network resource 162 via a network. The first response 114A may be associated with a first domain name resolution to obtain the network resource 162 from a first location (e.g., host device 160A). The first client device 120A may obtain the network resource 162 via the network from the first location based on the first domain name resolution.

In some embodiments, processing logic may update a cache in memory of the DNS server 110 with the first domain name resolution associated with the domain name to be used for a subsequent request 124 to access the network resource 162. The subsequent request 124 may include subsequent client context 164 similar to the first client context 164A.

In some embodiments, at block 440, processing logic receives, from a second client device 120B, a second request 124B for a network resource 162. The second request 124B includes second client context 126B associated with the second client device 120B.

In some embodiments, at block 442, processing logic identifies, based on the network resource 162 of the second request 124B, the dynamic variable 144 in the dynamic configuration file 142.

In some embodiments, at block 444, processing logic determines, based on at least one of the one or more algorithmically-defined rules of the dynamic variable 144 and the second client context 126B, a second response 114B to the second request 124B.

In some embodiments, at block 446, processing logic provides the second response 114B to the second client device 120B.

In some embodiments, the first client device 120A is to access a first instance of the network resource 162 based on the first response 114A and the second client device 120B is to access a second instance of the network resource 162 based on the second response 114B. The first instance may be located at a first location (e.g., first host device 160A) and the second instance may be located at a second location (e.g., second host device 160B) that is different from the first location.

In some embodiments, prior to the determining of the first response 114A, the processing logic adapts, via a pre-processing filter, at least one of the first request 124A or the first client context 126A. In some embodiments, subsequent to the determining of the first response 114A, the processing logic modifies, via a post-processing filter, the first response 114A.

In some embodiments, the determining of the first response 114A is based on proximity of available servers (e.g., host devices 160) to a location of the first client device 120A.

In some embodiments, the dynamic variable 144 further includes a one or more load-balancing rules. The determining of the first response 114A may be further based on at least one of the one or more load-balancing rules.

In some embodiments, the determining of the first response 114A is further based on a status of static status, fully dynamic status, or semi-dynamic status. The static status may be associated with a first domain name resolution that is saved to cache subsequent to successful domain name resolution. The fully dynamic status may be associated with the first domain name resolution that is saved to the cache based on the first client context 126A of the first request 124A. The semi-dynamic status may be associated with one or more cache saving rules that are determined by a Domain Administrator (e.g., DA device 150).

In some embodiments, the dynamic variable 144 is a dynamic domain zone record configuration associated with a plurality of network resource hosts. In some embodiments, the processing logic further determines one or more first hosts (e.g., host devices 160) of the network resource hosts that pass health checks and indicates the first hosts as being eligible to be considered for the first response 114A.

In some embodiments, the processing logic, further stores the first response 114A in a cache memory to be used for a subsequent request 124 for the network resource 162. The subsequent request 124 may include subsequent client context 126 similar to the first client context 126A.

In some embodiments, the processing logic further monitors monitoring changes to the dynamic configuration file 142 and deploys the changes responsive to determining that the changes are eligible for deployment.

Although some embodiments of the present disclosure are directed to unified programmable dynamic context-aware configurations for DNS, in some embodiments, the present disclosure can be used for unified programmable dynamic context-aware configurations for other services, systems, and/or networks.

Figure 5A:
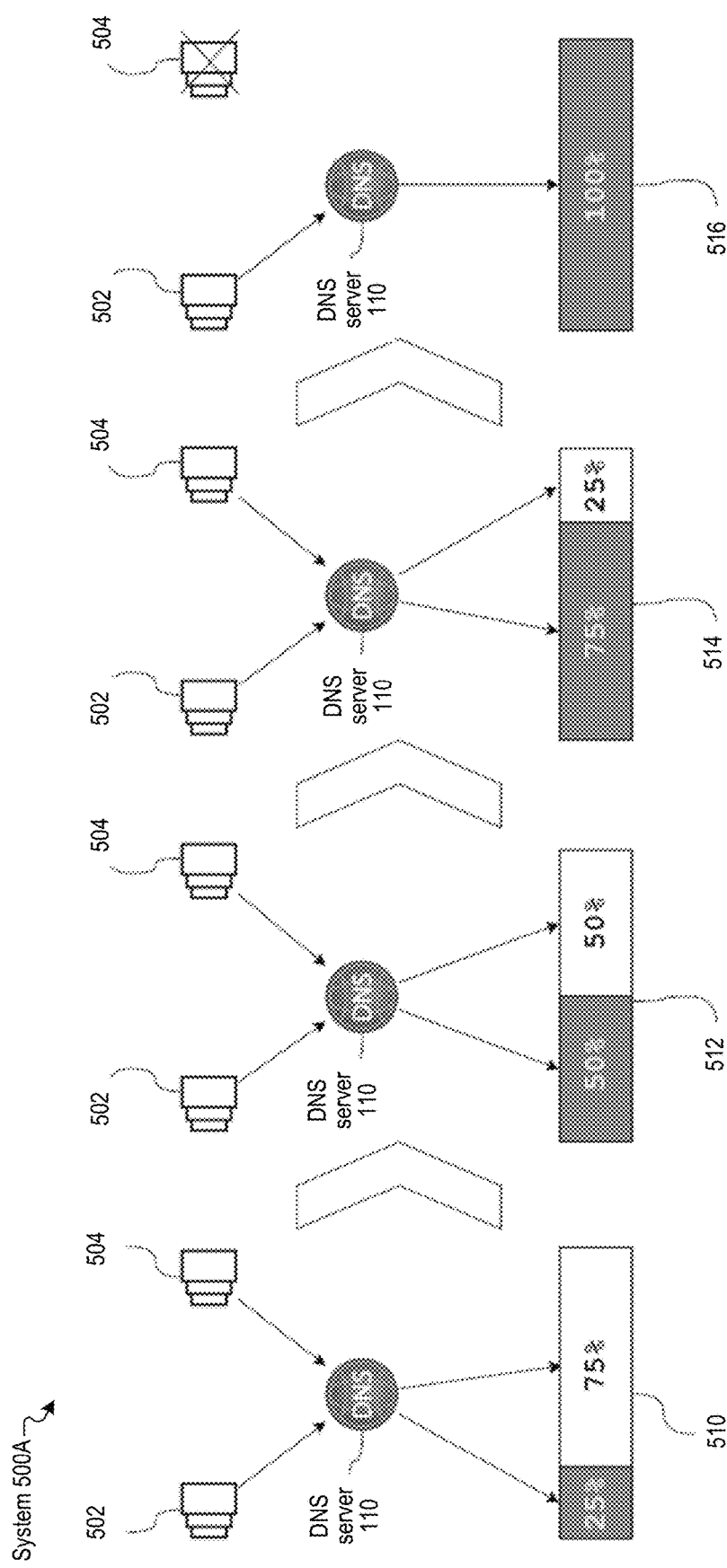
FIGS. 5A-C illustrate systems associated with unified programmable dynamic context-aware configurations, according to certain embodiments.
Figure 5B:
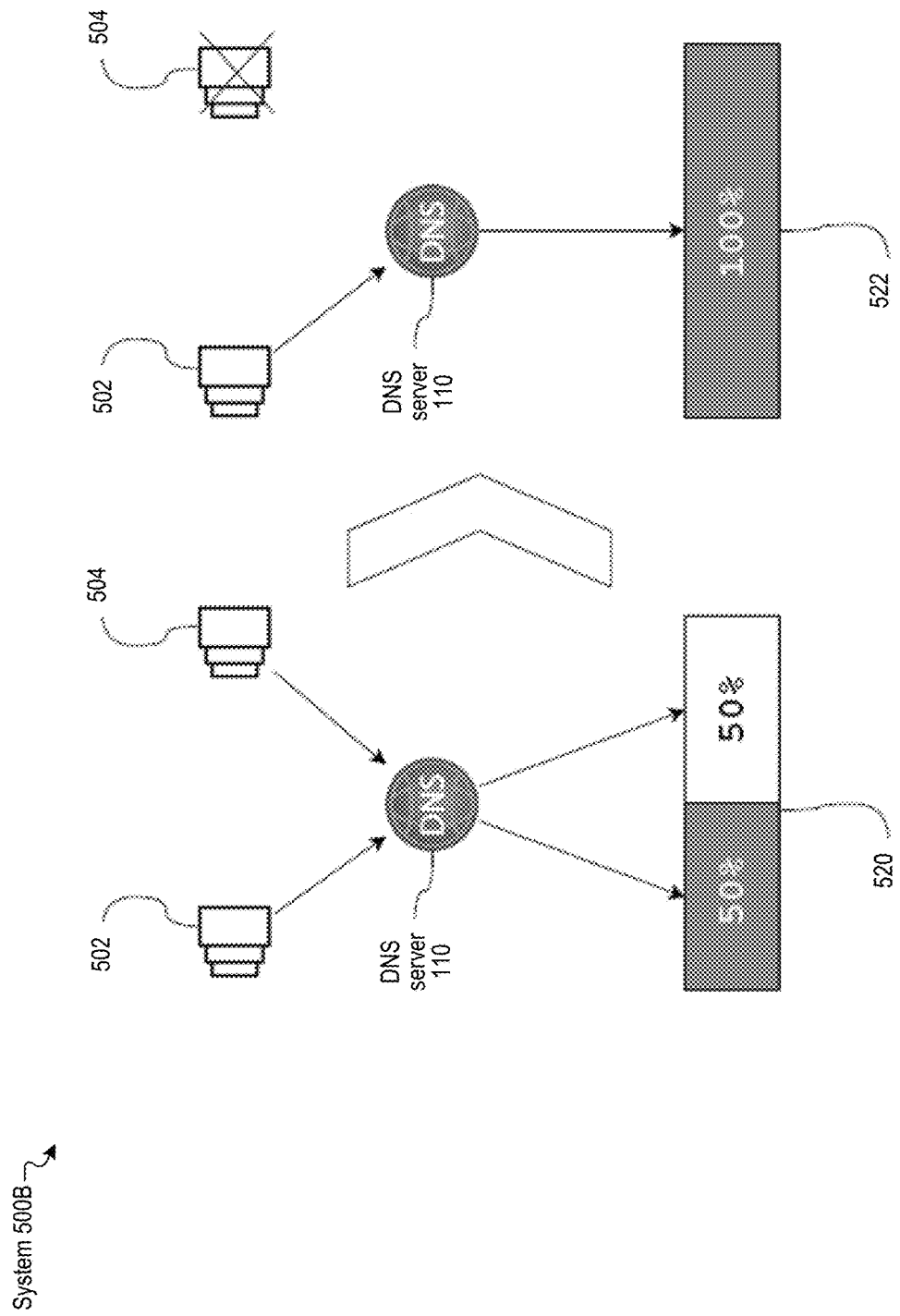
Figure 5C:
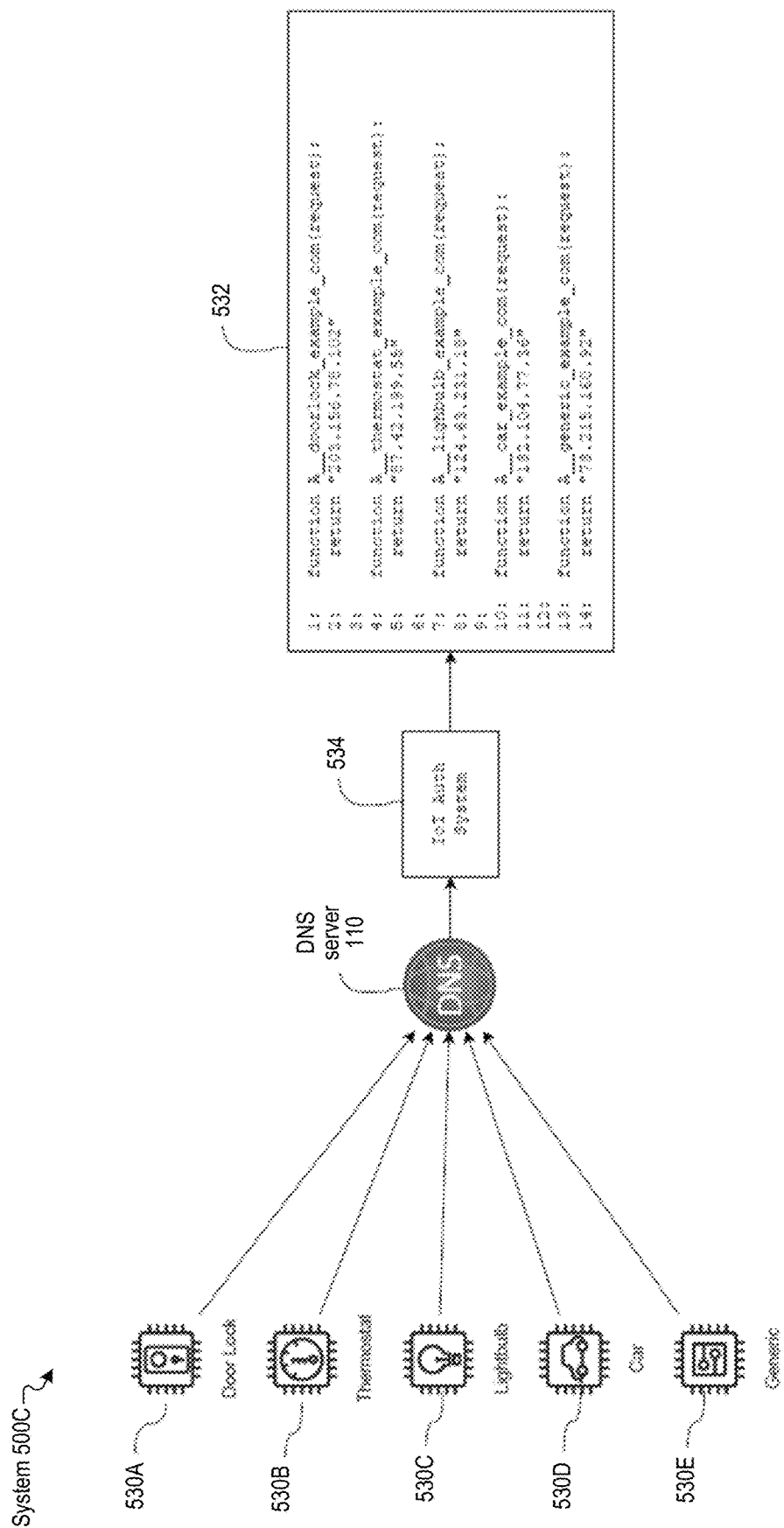

FIGS. 5A-C illustrate systems associated with unified programmable dynamic context-aware configurations, according to certain embodiments.

FIG. 5A illustrates a DNS server 110 executing an operation-by-operation canary deployment strategy of a new configuration revision 502 (e.g., of dynamic configuration file 142). In a first operation 510, the current configuration revision 504 (e.g., of dynamic configuration file 142) is served concurrently with the new configuration revision 502, with 25% of the traffic being randomly picked to get responses 114 as configured by the new configuration revision 502 and the remaining 75% of the traffic receiving the current revision 504. After executing this strategy for a period determined by the DA device 150 without generating any errors, the roll-out strategy progresses to the second operation 512. In the second operation 512, the traffic is evenly split between the current configuration revision 502 and the new configuration revision 502. After executing this strategy for a period determined by the DA device 150 without generating any errors, the roll-out strategy progresses to the third operation 414. In the third operation 414, the traffic is split randomly such that 75% of users are exposed to the new configuration revision 502 and the remaining 25% of the users are exposed to the current configuration revision 504. After executing this strategy for a period determined by the DA device 150 without generating any errors, the roll-out strategy progresses to the fourth and final operation 516. In the final operation, all traffic is served by the new configuration revision 502 and the current revision 504 is retired. The canary deployment strategy may be used in the context of a unified programmable dynamic context-aware configuration-enabled DNS server 110.

FIG. 5B illustrates a DNS server 110 executing a Blue/Green deployment strategy of a new configuration revision 502. In the initial state, the new configuration revision 502 (called the green revision) is deployed alongside the current configuration revision 504 (called the blue revision). Approximately half of the traffic is split between the two versions, and after executing this strategy 520 for a period determined by the DA device 150 without the new configuration revision 502 generating any errors, all traffic is directed to the new configuration revision 502 and the current configuration revision 504 is retired. The blue/green deployment strategy may be used in the context of a unified programmable dynamic context-aware configuration-enabled DNS server 110.

In some embodiments, the DA device 150 could use the dynamic nature to implement Deny, Allow, and Throttle lists and rules for clients. These lists could be generated automatically based on rules defined by the DA device 150 or provided in a separate file that would be consumed by the dynamic configuration file 142 during runtime to check a client against the list. This solution is useful for DA devices 150 looking to better control access to the name resolution service or mitigate attacks and abusive behavior.

These lists could be stored in any of the dynamic configuration files 142 or in separate files accessible to the DNS Server 110. The logic that checks these lists can be implemented inside domain zone record configuration functions, pre-processing filters, or even as a separate global function according to the needs of an administrator of the DA device 150 or of the DNS Server 110.

In some embodiments, the DA device 150 could use secure authentication mechanisms to allow IoT devices to submit their own domain zone record configurations to make them more easily accessible over the internet. The authenticated and securely submitted domain zone record configuration would need to pass test suites created by the DA device 150 and would only be allowed to manipulate the record associated with the IoT device. This is a useful solution for devices connected to the internet under a dynamic IP address configuration. This functionality allows the client to submit changes directly to the DNS server 110 (e.g., without using an intermediary API that then executes the configuration changes in the domain zone configuration). A benefit of this new approach is that new domain zone record configurations are made available in production more expediently, and IoT device developers do not need to create intermediary APIs to update DNS records, relying instead upon a single standard that all IoT devices can easily follow.

FIG. 5C illustrates how IoT devices 530A-E may be able to maintain their own records within a domain zone configuration 532. Upon an update event, in which the device name or IP address is changed, the device 530 retrieves the IP address of the authoritative nameserver (e.g., DNS server 110) of the domain by querying for a nameserver (NS) record on the domain example.com. Upon retrieving the IP address of the authoritative nameserver (e.g., DNS server 110), the IoT device proceeds to authenticate with the DNS Server 110 and/or IoT authentication system 534. Upon authentication, the DNS Server 110 and/or IoT authentication system 534 is now capable of recognizing which domain zone record that device is allowed to control and applies the changes requested by the IoT device in the domain zone record associated with it. For example, the door lock device 530A would be allowed to change its name and/or IP address associated with it (domain zone configuration 532, lines 1-2), but not allowed to change anything else in the domain zone configuration 532. Similarly, the thermostat device 530B would be allowed to change its name and/or IP address associated with it (domain zone configuration 532, lines 4-5) but no other record in the domain zone configuration 532. This allows for a better integrated and standardized solution for all sorts of IoT devices, which today, rely on custom intermediary services to replicate the same effect.

Combined, or separate, the unified programmable dynamic context-aware configuration may allow DA devices 150 to unlock the potential of the DNS protocol, implement intelligent load balancing through DNS server 110, reduce costs, save compute resources, and significantly reduce latency for clients. If the technology is widely adopted and is properly used, it has the capability of positively impacting by reducing unnecessary routing and limiting traffic to their own regions, providing a needed relief against the exponential growth of consumption demands of internet resources. It will also provide DA devices 150 with a tool that can be used to make novel uses of DNS servers 110 to promote business interests, mitigate attacks, reduce downtime, and several other benefits.

Figure 6:
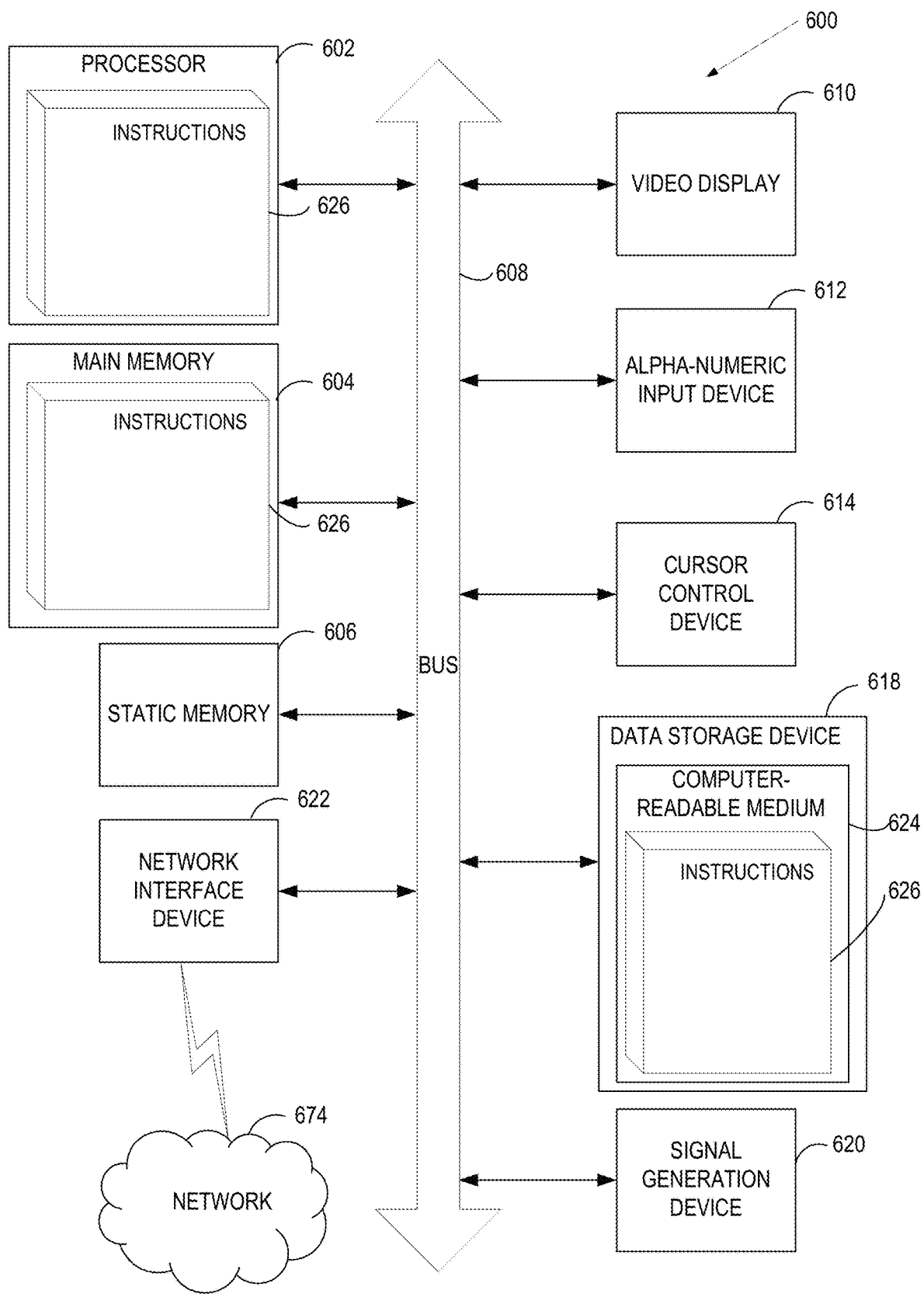
FIG. 6 is a block diagram illustrating a computer system, according to certain embodiments.

FIG. 6 is a block diagram illustrating a computer system 600, according to certain embodiments. In some embodiments, the processor 602 is device (e.g., client device, server, DNS server, processing device, etc.) of one or more of the FIGS. of the present disclosure. In some embodiments, the processor is associated with unified programmable dynamic context-aware configurations for domain name service (DNS).

In some embodiments, computer system 600 is connected (e.g., via a network, such as a Local Area Network (LAN), an intranet, an extranet, or the Internet) to other computer systems. In some embodiments, computer system 600 operates in the capacity of a server or a client computer in a client-server environment, or as a peer computer in a peer-to-peer or distributed network environment. In some embodiments, computer system 600 is provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein (e.g., one or more of methods 400A-B of FIGS. 4A-B).

In a further aspect, the computer system 600 includes a processing device 602, a volatile memory 604 (e.g., Random Access Memory (RAM)), a non-volatile memory 606 (e.g., Read-Only Memory (ROM) or Electrically-Erasable Programmable ROM (EEPROM)), and a data storage device 616, which communicate with each other via a bus 608.

In some embodiments, processing device 602 is provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

In some embodiments, computer system 600 further includes a network interface device 622 (e.g., coupled to network 674). In some embodiments, computer system 600 also includes a video display unit 610 (e.g., a liquid-crystal display (LCD)), an alphanumeric input device 612 (e.g., a keyboard), a cursor control device 614 (e.g., a mouse), and a signal generation device 620.

In some implementations, data storage device 616 includes a non-transitory computer-readable storage medium 624 on which store instructions 626 encoding any one or more of the methods or functions described herein, including instructions for implementing methods described herein.

In some embodiments, instructions 626 also reside, completely or partially, within volatile memory 604 and/or within processing device 602 during execution thereof by computer system 600, hence, in some embodiments, volatile memory 604 and processing device 602 also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In some embodiments, the methods, components, and features described herein are implemented by discrete hardware components or are integrated in the functionality of other hardware components such as ASICs, FPGAs, DSPs, or similar devices. In some embodiments, the methods, components, and features are implemented by firmware modules or functional circuitry within hardware devices. In some embodiments, the methods, components, and features are implemented in any combination of hardware devices and computer program components, or in computer programs.

Unless specifically stated otherwise, terms such as "identifying," "receiving," "transmitting," "determining," "providing," "accessing," "resolving," "obtaining," "adapting," "modifying," "storing," "causing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. In some embodiments, the terms "first," "second," "third," "fourth," etc. as used herein are meant as labels to distinguish among different elements and do not have an ordinal meaning according to their numerical designation.

Examples described herein also relate to an apparatus for performing the methods described herein. In some embodiments, this apparatus is specially constructed for performing the methods described herein or includes a general-purpose computer system selectively programmed by a computer program stored in the computer system. Such a computer program is stored in a computer-readable tangible storage medium.

Some of the methods and illustrative examples described herein are not inherently related to any particular computer or other apparatus. In some embodiments, various general-purpose systems are used in accordance with the teachings described herein. In some embodiments, a more specialized apparatus is constructed to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

The preceding description sets forth numerous specific details such as examples of specific systems, components, methods, and so forth in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

The terms "over," "under," "between," "disposed on," and "on" as used herein refer to a relative position of one material layer or component with respect to other layers or components. For example, one layer disposed on, over, or under another layer may be directly in contact with the other layer or may have one or more intervening layers. Moreover, one layer disposed between two layers may be directly in contact with the two layers or may have one or more intervening layers. Similarly, unless explicitly stated otherwise, one feature disposed between two features may be in direct contact with the adjacent features or may have one or more intervening layers.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

Reference throughout this specification to "one embodiment," "an embodiment," or "some embodiments" means that a particular feature, structure, or characteristic described in connection with the embodiment is included in at least one embodiment. Thus, the appearances of the phrase "in one embodiment," "in an embodiment," or "in some embodiments" in various places throughout this specification are not necessarily all referring to the same embodiment. In addition, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Also, the terms "first," "second," "third," "fourth," etc. as used herein are meant as labels to distinguish among different elements and can not necessarily have an ordinal meaning according to their numerical designation. When the term "about," "substantially," or "approximately" is used herein, this is intended to mean that the nominal value presented is precise within ±10%.

Although the operations of the methods herein are shown and described in a particular order, the order of operations of each method may be altered so that certain operations may be performed in an inverse order so that certain operations may be performed, at least in part, concurrently with other operations. In another embodiment, instructions or sub-operations of distinct operations may be in an intermittent and/or alternating manner.

It is understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving, by a Domain Name Service (DNS) server, a dynamic configuration file from a domain administrator device;
   loading, by the DNS server, the dynamic configuration file in memory;
   receiving, by the DNS server from a first client device, a first request for a network resource, the first request comprising first client context associated with the first client device;
   identifying, by the DNS server based on the network resource of the first request, a dynamic variable in the dynamic configuration file, the dynamic variable comprising one or more algorithmically-defined rules;
   executing, by the DNS server, at least one of the one or more algorithmically-defined rules of the dynamic variable to determine, based on the first client context, a first response to the first request; and
   providing, by the DNS server, the first response to the first client device.

2. The method of claim 1, wherein the first client device is to access a first instance of the network resource based on the first response.

3. The method of claim 1 further comprising:
   receiving, by the DNS server from a second client device, a second request for the network resource, the second request comprising second client context associated with the second client device;
   identifying, by the DNS server based on the second request, the dynamic variable in the dynamic configuration file;
   executing, by the DNS server, one or more corresponding algorithmically-defined rules of the dynamic variable to determine, based on the second client context, a second response to the second request; and
   providing, by the DNS server, the second response to the second client device.

4. The method of claim 3, wherein:
   the first client device is to access a first instance of the network resource based on the first response; and
   the second client device is to access a second instance of the network resource based on the second response; and
   the first instance being located at a first location and the second instance being located at a second location that is different from the first location.

5. The method of claim 1, wherein:
   the first request is associated with resolving a domain name to access the network resource via a network;
   the first response is associated with a first domain name resolution to obtain the network resource from a first location; and
   the first client device is to obtain the network resource via the network from the first location based on the first domain name resolution.

6. The method of claim 5 further comprising updating a cache of the DNS server with the first domain name resolution associated with the domain name to be used for a subsequent request to access the network resource, wherein the subsequent request comprises subsequent client context similar to the first client context.

7. The method of claim 1, wherein the network resource is a domain record.

8. The method of claim 1, further comprising:
   prior to the executing of the at least one of the one or more algorithmically-defined rules of the dynamic variable to determine of the first response, adapting, via a pre-processing filter, at least one of the first request or the first client context; and
   subsequent to the executing of the at least one of the one or more algorithmically-defined rules of the dynamic variable to determine of the first response, modifying, via a post-processing filter, the first response.

9. The method of claim 1, wherein the executing of the at least one of the one or more algorithmically-defined rules of the dynamic variable to determine the first response is based on proximity of available servers to a location of the first client device.

10. The method of claim 1, wherein:
    the dynamic variable further comprises a one or more load-balancing rules; and
    the executing of the at least one of the one or more algorithmically-defined rules of the dynamic variable to determine the first response is further based on at least one of the one or more load-balancing rules.

11. The method of claim 1, wherein:
    the executing of the at least one of the one or more algorithmically-defined rules of the dynamic variable to determine the first response is further based on a status of static status, fully dynamic status, or semi-dynamic status;
    the static status is associated with a first domain name resolution that is saved to cache subsequent to successful domain name resolution;
    the fully dynamic status is associated with the first domain name resolution that is saved to the cache based on the first client context of the first request; and
    the semi-dynamic status is associated with one or more cache saving rules that are determined by a Domain Administrator.

12. The method of claim 1, wherein:
    the dynamic variable is a dynamic domain zone record configuration associated with a plurality of network resource hosts; and
    the method further comprises determining one or more first hosts of the plurality of network resource hosts that pass health checks and indicating the first hosts as being eligible to be considered for the first response.

13. The method of claim 1 further comprising storing the first response in a cache memory to be used for a subsequent request for the network resource, wherein the subsequent request comprises subsequent client context similar to the first client context.

14. The method of claim 1 further comprising;
    monitoring changes to the dynamic configuration file; and
    deploying the changes responsive to determining that the changes are eligible for deployment.

15. A non-transitory machine-readable storage medium storing instructions which, when executed, cause a processing device of a Domain Name Service (DNS) server to perform operations comprising:
 receiving a dynamic configuration file from a domain administrator device;
 loading the dynamic configuration file in memory;
 receiving, from a first client device, a first request for a network resource, the first request comprising first client context associated with the first client device;
 identifying, based on the network resource of the first request, a dynamic variable in the dynamic configuration file, the dynamic variable comprising one or more algorithmically-defined rules;
 executing at least one of the one or more algorithmically-defined rules of the dynamic variable to determine, based on the first client context, a first response to the first request; and
 providing the first response to the first client device.

16. The non-transitory machine-readable storage medium of claim 15, wherein the operations further comprise:
 receiving, from a second client device, a second request for the network resource, the second request comprising second client context associated with the second client device;
 identifying, based on the second request, the dynamic variable in the dynamic configuration file;
 executing one or more corresponding algorithmically-defined rules of the dynamic variable to determine, based on the second client context, a second response to the second request; and
 providing the second response to the second client device.

17. The non-transitory machine-readable storage medium of claim 16, wherein:
 the first client device is to access a first instance of the network resource based on the first response; and
 the second client device is to access a second instance of the network resource based on the second response; and
 the first instance being located at a first location and the second instance being located at a second location that is different from the first location.

18. A Domain Name Service (DNS) server comprising:
 memory; and
 a processing device coupled to the memory, the processing device to:
  receive a dynamic configuration file from a domain administrator device;
  load the dynamic configuration file in the memory;
  receive, from a first client device, a first request for a network resource, the first request comprising first client context associated with the first client device;
  identify, based on the network resource of the first request, a dynamic variable in the dynamic configuration file, the dynamic variable comprising one or more algorithmically-defined rules;
  execute at least one of the one or more algorithmically-defined rules of the dynamic variable to determine, based on the first client context, a first response to the first request; and
  provide the first response to the first client device.

19. The DNS server of claim 18, wherein the processing device is further to:
 receive, from a second client device, a second request for the network resource, the second request comprising second client context associated with the second client device;
 identify, based on the second request, the dynamic variable in the dynamic configuration file;
 execute one or more corresponding algorithmically-defined rules of the dynamic variable to determine, based on the second client context, a second response to the second request; and
 provide the second response to the second client device.

20. The DNS server of claim 19, wherein:
 the first client device is to access a first instance of the network resource based on the first response; and
 the second client device is to access a second instance of the network resource based on the second response; and
 the first instance being located at a first location and the second instance being located at a second location that is different from the first location.

\* \* \* \* \*